(12) United States Patent
Okano et al.

(10) Patent No.: US 11,912,449 B2
(45) Date of Patent: Feb. 27, 2024

(54) ARTICLE GRIPPING SYSTEM

(71) Applicant: ISHIDA CO., LTD., Kyoto (JP)

(72) Inventors: Hiroshi Okano, Ritto (JP); Shuichi Maeda, Ritto (JP); Yuki Furukawa, Ritto (JP); Masaaki Hojo, Ritto (JP); Akihito Suzuki, Ritto (JP); Kousuke Watanabe, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 17/791,506

(22) PCT Filed: Mar. 16, 2021

(86) PCT No.: PCT/JP2021/010571
§ 371 (c)(1),
(2) Date: Jul. 7, 2022

(87) PCT Pub. No.: WO2021/187470
PCT Pub. Date: Sep. 23, 2021

(65) Prior Publication Data
US 2023/0140538 A1 May 4, 2023

(30) Foreign Application Priority Data
Mar. 19, 2020 (JP) ................. 2020-049144

(51) Int. Cl.
*B65B 35/16* (2006.01)
*B25J 15/00* (2006.01)
(Continued)

(52) U.S. Cl.
CPC ........... *B65B 35/16* (2013.01); *B25J 15/0028* (2013.01); *B25J 15/0052* (2013.01); *B65B 43/59* (2013.01); *B65G 47/901* (2013.01)

(58) Field of Classification Search
CPC ....... B65B 35/16; B65B 47/901; B65B 43/59; B25J 15/0052; B25J 15/0028
See application file for complete search history.

(56) References Cited

U.S. PATENT DOCUMENTS 5,321,212 A * 6/1994 Wadell ................. G01G 19/393
177/25.18
2003/0232709 A1* 12/2003 Ronchi ................ B65G 47/901
493/309

(Continued)

FOREIGN PATENT DOCUMENTS

CN 209979046 U 1/2020
CN 112109100 A 12/2020

(Continued)

OTHER PUBLICATIONS

International Search Report issued in PCT/JP2021/010571; dated Apr. 13, 2021.

(Continued)

*Primary Examiner* — Anna K Kinsaul
*Assistant Examiner* — Himchan Song
(74) *Attorney, Agent, or Firm* — Studebaker & Brackett PC

(57) ABSTRACT

To provide an article gripping system that reduces the installation area of the apparatus and further shortens the amount of time from when it grips to when it feeds articles. An article gripping system (110) switches between a first positional relationship in which a container (50) obstructs discharge of articles gripped by a first gripping unit (15A) but does not obstruct discharge of articles by a second gripping unit (15B) and a second positional relationship in which the container (50) obstructs discharge of articles gripped by the second gripping unit (15B) but does not obstruct discharge of articles gripped by the first gripping unit (15A), so the gripping units do not move while they are (Continued)

holding the articles, and the articles can be prevented from falling out of the gripping units (15).

15 Claims, 16 Drawing Sheets

(51) Int. Cl.
*B65B 43/59* (2006.01)
*B65G 47/90* (2006.01)

(56) References Cited

U.S. PATENT DOCUMENTS

| | | | |
|---|---|---|---|
| 2007/0119125 A1* | 5/2007 | Stenbom | B65B 5/105 |
| | | | 53/473 |
| 2008/0199289 A1 | 8/2008 | Schafer | |
| 2014/0023461 A1* | 1/2014 | Schaller | H05F 3/02 |
| | | | 901/30 |
| 2014/0105719 A1* | 4/2014 | Mueller | G01B 11/14 |
| | | | 414/800 |
| 2017/0015005 A1* | 1/2017 | Joplin | B65B 9/045 |
| 2017/0036794 A1* | 2/2017 | Sassi | B65B 5/105 |
| 2019/0322451 A1* | 10/2019 | Bastian, II | B65B 11/008 |
| 2020/0398314 A1 | 12/2020 | Maeda et al. | |

FOREIGN PATENT DOCUMENTS

| | | |
|---|---|---|
| CN | 112297001 A | 2/2021 |
| CN | 112318532 A | 2/2021 |
| JP | H06-3182 A | 1/1994 |
| JP | 2000-077498 A | 3/2000 |
| JP | 2015-134381 A | 7/2015 |
| WO | 2019/176808 A1 | 9/2019 |

OTHER PUBLICATIONS

Written Opinion of the International Searching Authority issued in PCT/JP2021/010571; dated Sep. 20, 2022.
"Decision to Grant a Patent" Office Action issued in JP 2020-049144; mailed by the Japanese Patent Office dated Aug. 24, 2021.
International Search Report issued in PCT/JP2021/010572; dated May 25, 2021.
International Preliminary Report On Patentability and Written Opinion issued in PCT/JP2021/010572; dated Sep. 20, 2022.
The extended European search report issued by the European Patent Office dated Jan. 23, 2023, which corresponds to European Patent Application No. 21772057.2-1001 and is related to U.S. Appl. No. 17/791,506.

* cited by examiner

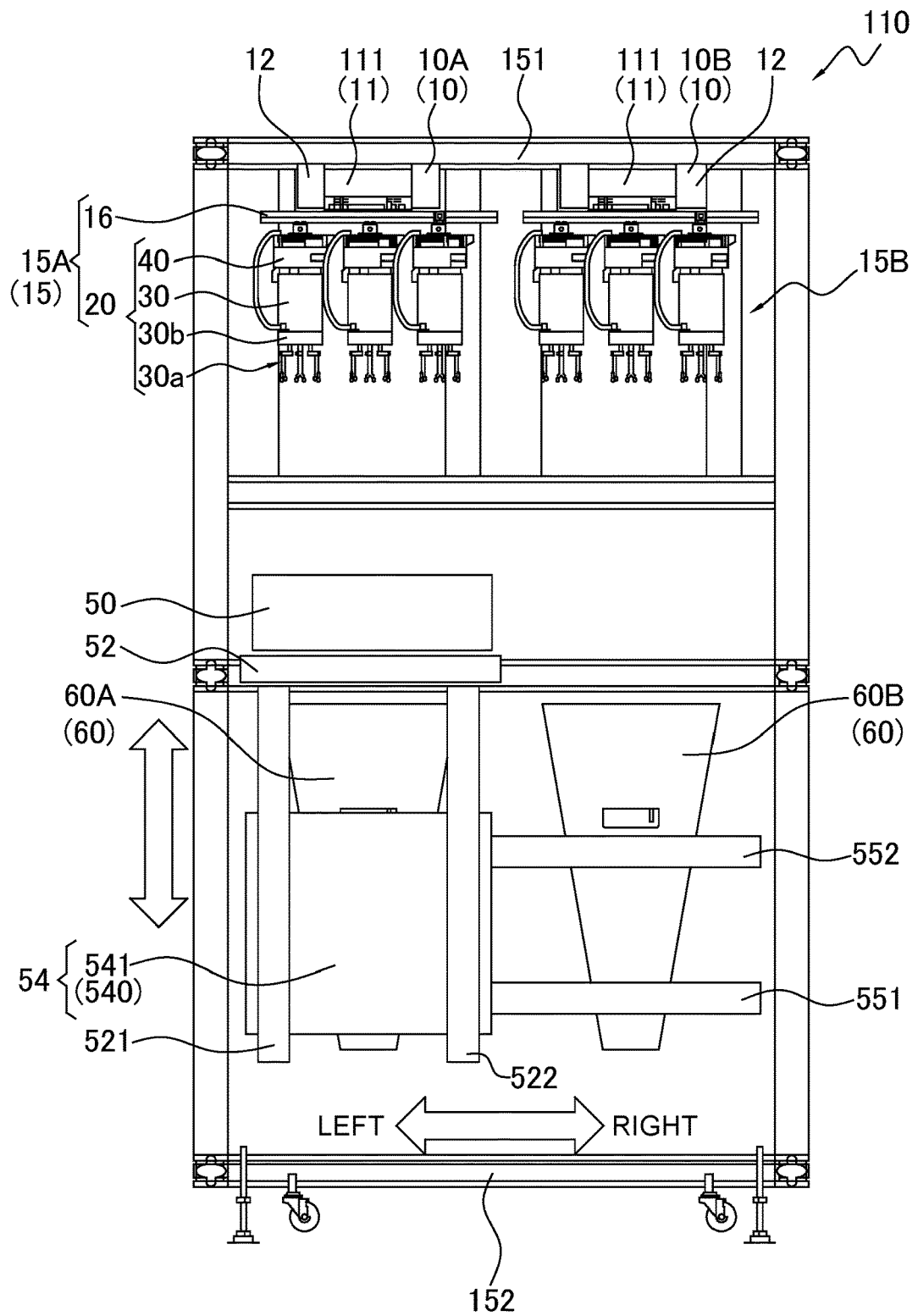
F I G. 1A

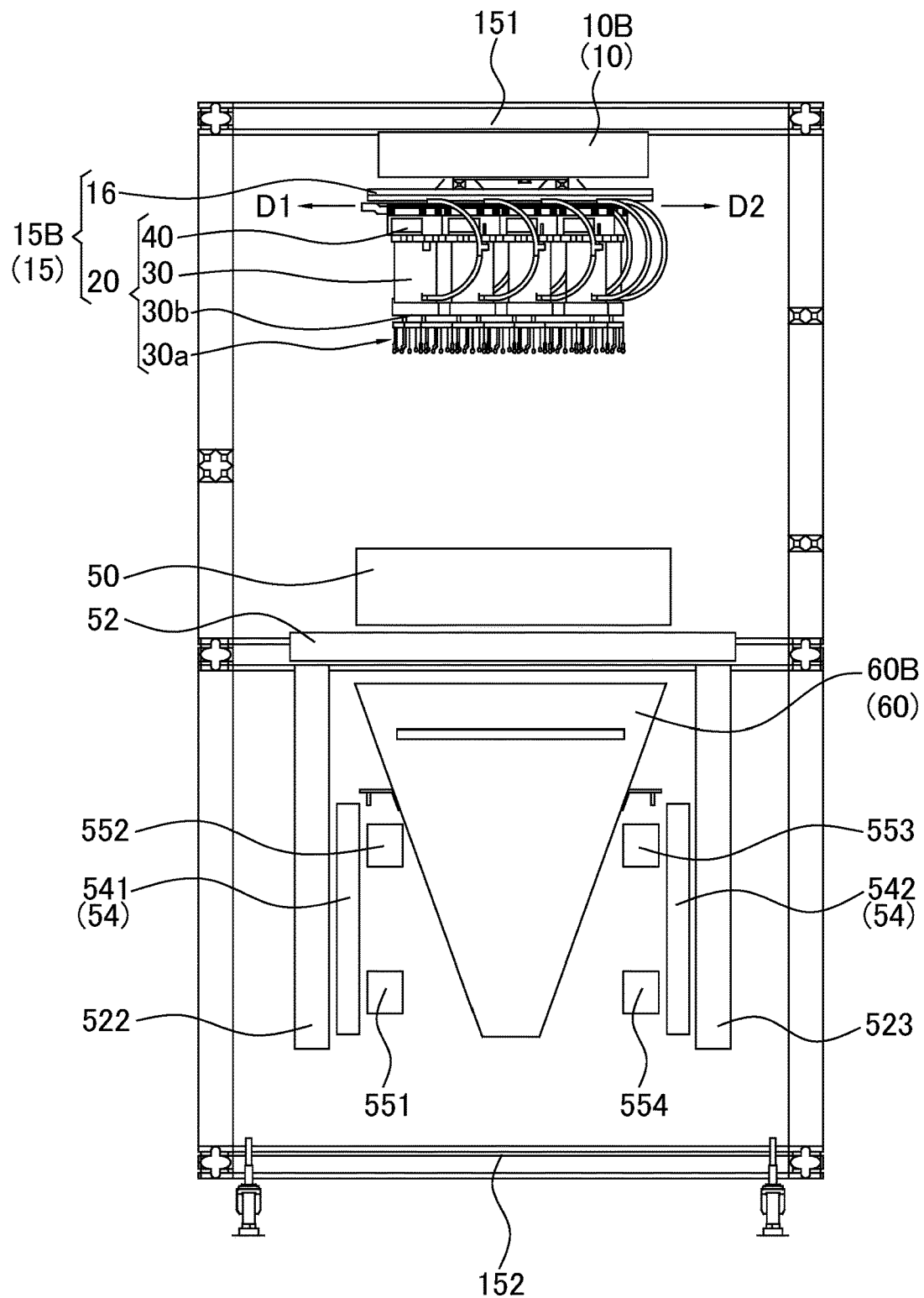
F I G. 1B

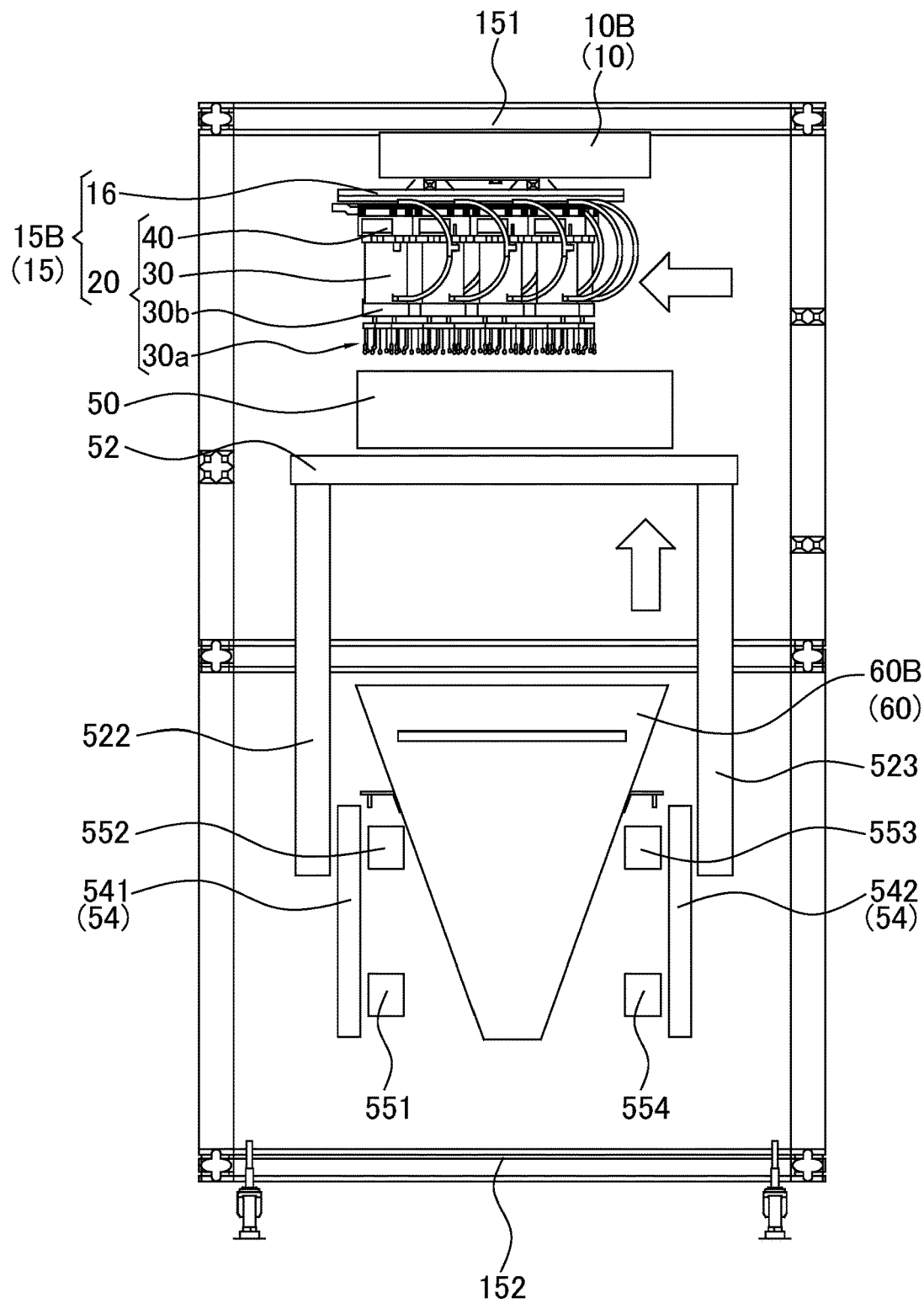
F I G. 6

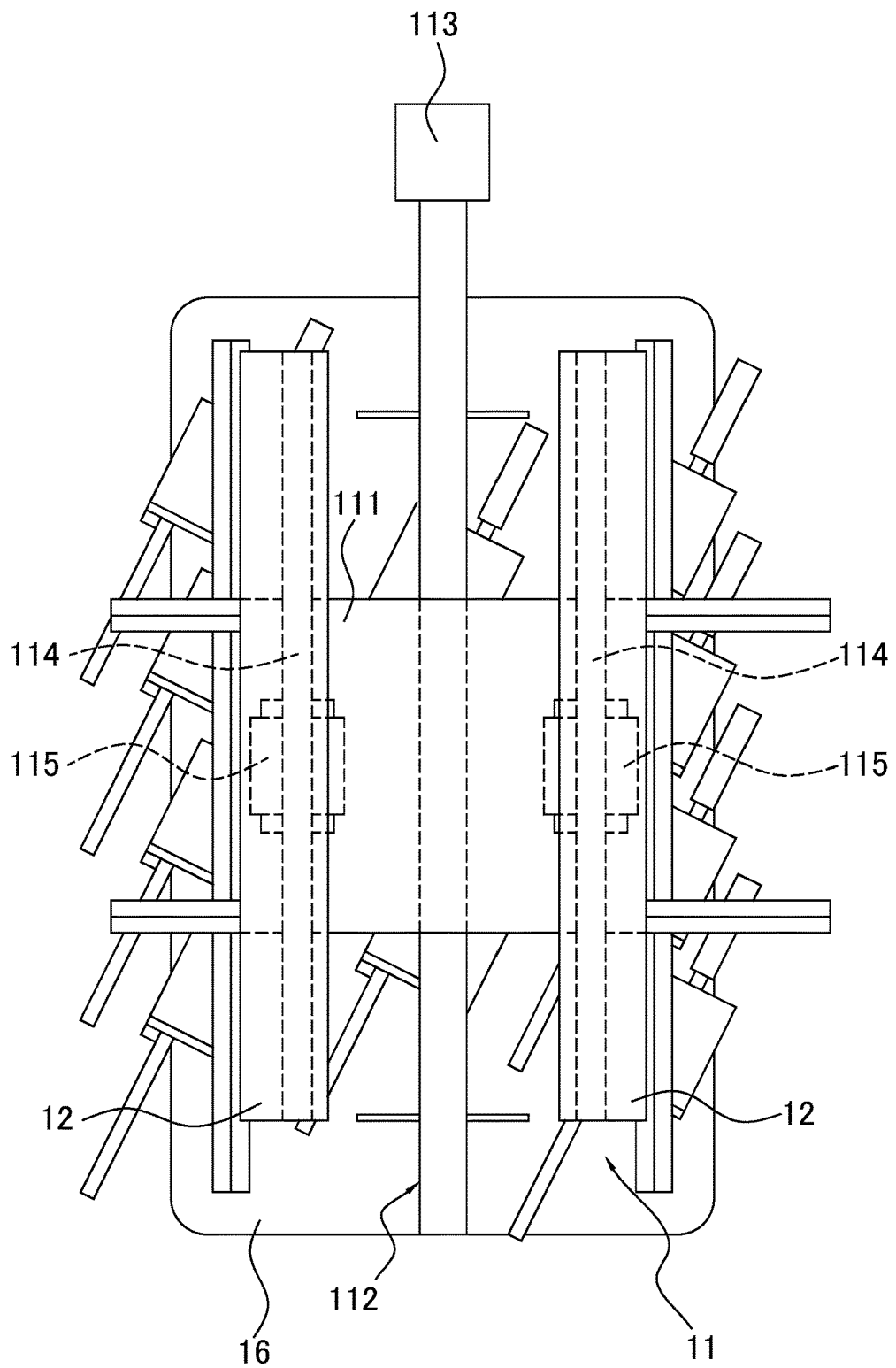
F I G. 9

ARTICLE GRIPPING SYSTEM

TECHNICAL FIELD

The present invention relates to an article gripping system.

BACKGROUND ART

As a weighing and distributing apparatus, for example, patent document 1 (JP-A No. H6-3182) discloses an apparatus having plural picking units each provided with a gripping means that grips and removes a portion of a product and a weighing means that records the weight of the portion of the product.

The apparatus further comprises a distribution means and a computer preprogrammed for a predetermined total weight, wherein the weighing means measures the weight of the product gripped by the gripping means and feeds it to a predetermined place.

SUMMARY OF INVENTION

Technical Problem

However, in the above apparatus, a region for gripping the product and a region for feeding the product are separately necessary, and the installation area of the apparatus becomes large and the amount of time from when it grips to when it feeds the product becomes long.

It is a problem of the present invention to provide an article gripping system that reduces the installation area of the apparatus and further shortens the amount of time from when it grips to when it feeds articles.

Solution to Problem

An article gripping system of a first aspect is an article gripping system that grips and discharges articles from an article group stored in a container, the article gripping system including plural gripping units, a drive unit, and a control unit. The gripping units grip the articles. The drive unit moves at least one of the container and the gripping units relative to the other. The control unit controls the drive unit to move at least one of the container and the gripping units. Moreover, the control unit switches the positional relationship between the container and a specific gripping unit between a first positional relationship and a second positional relationship. The first positional relationship is a positional relationship in which the container obstructs discharge of the articles gripped by the specific gripping unit. The second positional relationship is a positional relationship in which the container does not obstruct discharge of the articles gripped by the specific gripping unit.

In this article gripping system, for example, the container can also be moved to gripping positions of the gripping units, and in this case, the gripping units do not move while they are holding the articles, and the articles can be prevented from falling out of the gripping units.

An article gripping system of a second aspect is the article gripping system of the first aspect, wherein the drive unit includes a first horizontal moving mechanism. The first horizontal moving mechanism moves at least one of the container and the gripping units relative to the other in a first horizontal direction.

In this article gripping system, in a case where the plural gripping units are disposed in the horizontal direction, the position of the article group in the container and article gripping positions set for each of the gripping units can be aligned by the first horizontal moving mechanism.

An article gripping system of a third aspect is the article gripping system of the second aspect, wherein the drive unit further includes a second horizontal moving mechanism. The second horizontal moving mechanism moves at least one of the container and the gripping units relative to the other in a second horizontal direction different from the first horizontal direction.

In this article gripping system, in a case where the plural gripping units are disposed in the horizontal direction, the position of the article group in the container and article gripping positions set for each of the gripping units can be aligned by the second horizontal moving mechanism.

An article gripping system of a fourth aspect is the article gripping system of any one of the first aspect to the third aspect, wherein the drive unit further includes a vertical moving mechanism. The vertical moving mechanism moves at least one of the container and the gripping units relative to the other in a vertical direction.

In this article gripping system, in a case where the container is disposed away from the gripping units in the vertical direction, the position of the article group in the container and article gripping positions set for each of the gripping units can be aligned by the vertical moving mechanism.

An article gripping system of a fifth aspect is the article gripping system of the fourth aspect, wherein the control unit raises or lowers the container via the vertical moving mechanism. Moreover, when raising the container, the control unit finishes operating the first horizontal moving mechanism and the second horizontal moving mechanism before the container finishes rising.

In this article gripping system, when raising the container, the control unit finishes operating the first horizontal moving mechanism and the second horizontal moving mechanism before the container finishes rising, so the article group in the container is kept from ending up being shifted in either forward and backward or leftward and rightward directions.

An article gripping system of a sixth aspect is the article gripping system of any one of the first aspect to the fifth aspect, wherein the gripping units include plural claws. The plural claws are switched to at least either of a first state and a second state. The first state is a state in which the relative distance between the claws is decreased to a first distance so that the claws grip the articles. The second state is a state in which the relative distance between the claws is increased to a second distance greater than the first distance so that the claws release the articles.

An article gripping system of a seventh aspect is the article gripping system of the sixth aspect, wherein the control unit raises or lowers the container via the vertical moving mechanism. Moreover, when raising the container the control unit switches the plural claws to the second state before the container finishes rising.

In this article gripping system, when raising the container the control unit switches the claws to the second state (a state in which the claws are open) before the container finishes rising, so the articles in the container are kept from ending up being shifted in either forward and backward or leftward and rightward directions.

An article gripping system of an eighth aspect is the article gripping system of the seventh aspect, wherein the control unit switches the plural claws to the first state after it has raised the container.

In this article gripping system, the claws are switched to the first state (a state in which the claws are closed) in a state in which they are in the middle of the article group in the container, so the articles can be reliably held.

An article gripping system of a ninth aspect is the article gripping system of any one of the third aspect to the eighth aspect, wherein the second horizontal moving mechanism moves the gripping units in a second horizontal direction different from the first horizontal direction.

In this article gripping system, in the case of a type that moves the gripping units up and down, the gripping units need to weigh the articles after they grip hold of them and finish rising. In contrast, in the case of a type where the container moves upward, downward, leftward, and rightward and the gripping units move forward and backward, the gripping units can move in advance in forward and backward directions before gripping the articles and weigh the articles right after gripping hold of them.

An article gripping system of a tenth aspect is the article gripping system of any one of the fourth aspect to the ninth aspect, wherein the first horizontal moving mechanism moves the container and the vertical moving mechanism in the first horizontal direction.

In this article gripping system, the vertical moving mechanism does not need to raise and lower the first horizontal moving mechanism and need only raise and lower just the container, so the load when raising and lowering the container is mitigated.

An article gripping system of an eleventh aspect is the article gripping system of the tenth aspect, further including a discharge chute. The discharge chute has an inlet positioned lower than the container, receives, in the inlet, the articles released and dropped by the gripping units, and discharges them to a predetermined place. The first horizontal moving mechanism operates below the inlet of the discharge chute.

In this article gripping system, by avoiding disposing a sliding object (the first horizontal moving mechanism) in the space above the inlet of the discharge chute, contamination of the discharge chute is prevented.

An article gripping system of a twelfth aspect is the article gripping system of the eleventh aspect, wherein the vertical moving mechanism completely finishes moving the container in the vertical direction below the inlet of the discharge chute.

In this article gripping system, by avoiding disposing a sliding object (e.g., the vertical moving mechanism) in the space above the inlet of the discharge chute, contamination of the discharge chute is prevented.

An article gripping system of a thirteenth aspect is the article gripping system of any one of the first aspect to the twelfth aspect, wherein the plural gripping units include at least a first gripping unit and a second gripping unit. The control unit moves the article group in the container to a first gripping position where the first gripping unit grips the articles. Moreover, the control unit causes the first gripping unit to grip the articles and thereafter moves the article group in the container to a second gripping position where the second gripping unit grips the articles.

An article gripping system of a fourteenth aspect is the article gripping system of the thirteenth aspect, wherein the control unit moves the article group in the container to the second gripping position and thereafter causes the first gripping unit to release the articles and causes the second gripping unit to grip the articles from the article group in the container.

An article gripping system of a fifteenth aspect is the article gripping system of the fourteenth aspect, wherein the control unit interlinks the operation of causing the first gripping unit to release the articles and the operation of causing the second gripping unit to grip the articles.

Advantageous Effects of Invention

In this article gripping system, for example, the container can also be moved to the gripping positions of the gripping units, and in this case, the gripping units do not move while they are holding the articles, and the articles can be prevented from falling out of the gripping units.

BRIEF DESCRIPTION OF DRAWINGS

FIG. 1A is a front view of an article gripping system pertaining to an embodiment of the present invention.

FIG. 1B is a side view, when viewed from the right side, of the article gripping system of FIG. 1A.

FIG. 6 is a side view, when viewed from the right side, of the article gripping system of FIG. 5A when the container of the article gripping system has moved vertically upward.

FIG. 9 is a plan view showing an example of a forward and backward moving mechanism.

DESCRIPTION OF EMBODIMENT

An embodiment of the present invention will be described with reference to the drawings. The embodiment described below is a specific example of the present invention and is not intended to limit the technical scope of the present invention.

(1) Configuration of Article Gripping System 110

Figure 1C:
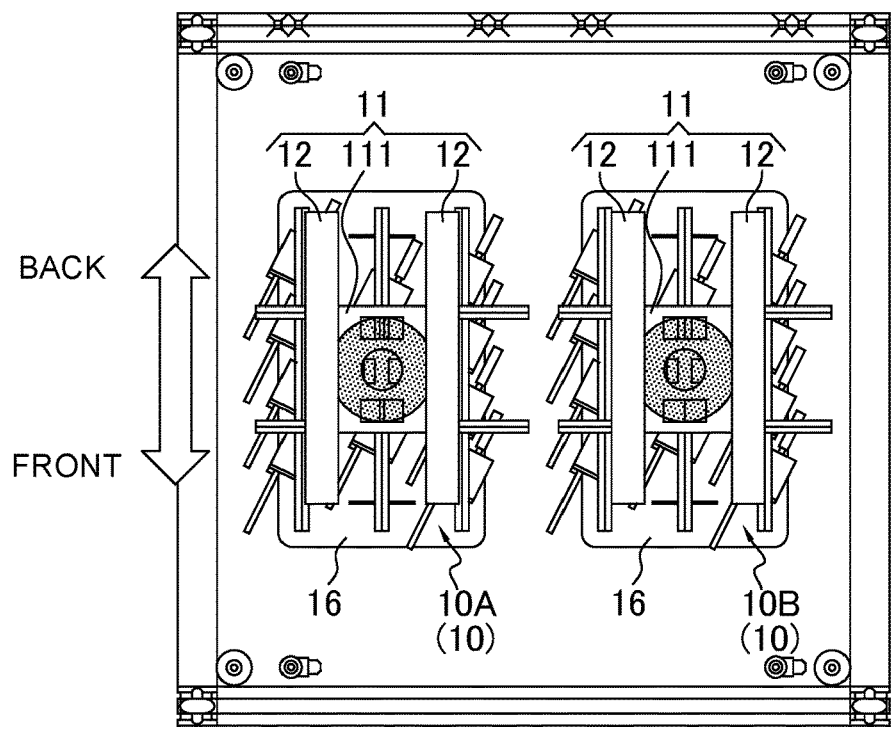
FIG. 1C is a plan view, when viewed from directly above, of the article gripping system of FIG. 1A.
Figure 1D:
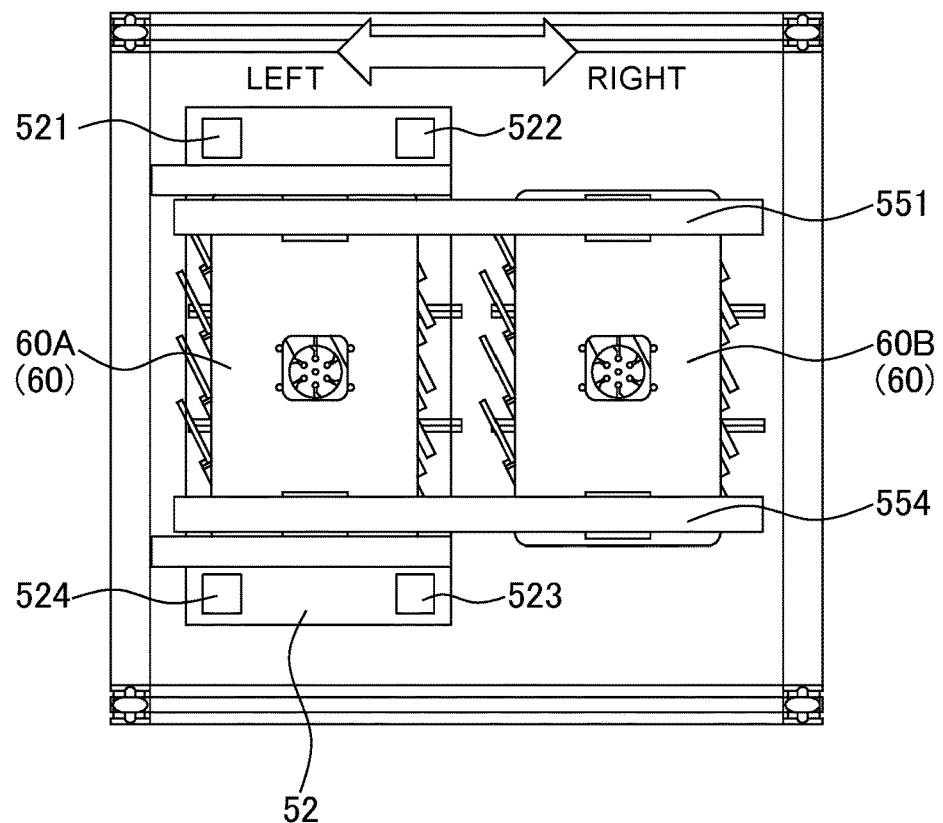
FIG. 1D is a bottom view, when viewed from directly below, of the article gripping system of FIG. 1A.

FIG. 1A is a front view of an article gripping system 110 pertaining to an embodiment of the present invention, and FIG. 1B is a side view, when viewed from the right side, of the article gripping system 110 of FIG. 1A. Furthermore, FIG. 1C is a plan view, when viewed from directly above, of the article gripping system 110 of FIG. 1A, and FIG. 1D is a bottom view, when viewed from directly below, of the article gripping system 110 of FIG. 1A.

Figure 2:
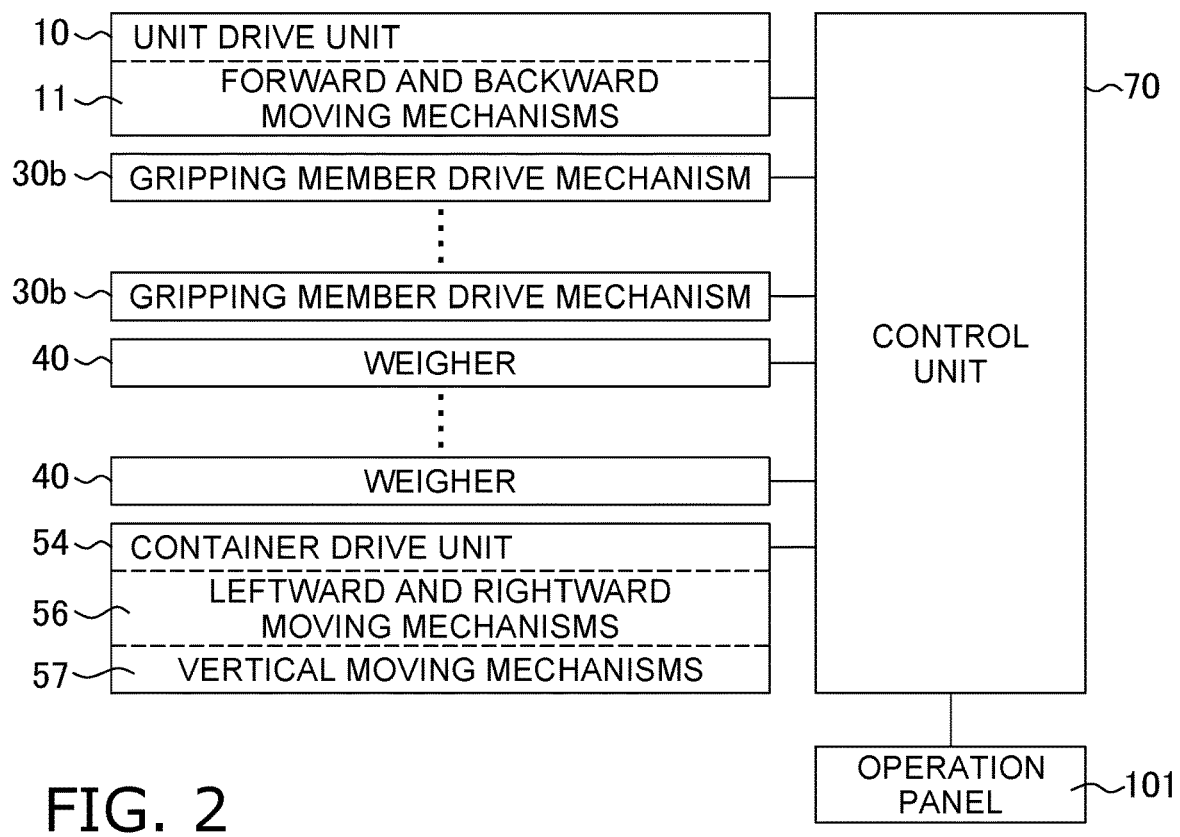
FIG. 2 is a block diagram of the article gripping system.

In FIG. 1A, FIG. 1B, and FIG. 2, the article gripping system 110 is an apparatus that removes and discharges a portion of articles A from an article group A1 that is a collection of the articles A.

Specifically, the article gripping system 110 removes from the article group A1 and discharges a portion of the articles A so that their weight falls within a target weight range. The articles A discharged by the article gripping system 110 become packaged in bags or put into containers in a process after the article gripping system 110 and shipped as products.

The article gripping system 110 is provided with unit drive units 10, gripping units 15, a container 50, a container drive unit 54, discharge chutes 60, and a control unit 70.

The unit drive units 10 have the gripping units 15 attached to them. The gripping units 15 each have one or more gripping modules 20. In each gripping module 20, a gripper 30 that grips the articles A and a weigher 40 that measures the weight value of the articles A are integrally assembled. Each gripper 30 has gripping claws 30a serving as gripping members that grip the articles A. Furthermore, incorporated into each gripper 30 is a gripping member drive mechanism 30b that drives the gripping claws 30a. The weigher 40 measures the weight value of the articles A gripped by the gripper 30.

The container 50 contains the article group A1. The articles A are, for example, a sticky food, such as spaghetti or other noodles or foods containing a lot of sugar.

The container 50 is moved by the container drive unit 54 between a first position where the grippers 30 grip the articles A in the article group A1 placed in the container 50 and a second position where the grippers 30 do not grip the articles A from the article group A1 placed in the container 50. The discharge chutes 60 receive and discharge the articles A released by the grippers 30.

FIG. 2 is a block diagram of the article gripping system 110. In FIG. 2, the control unit 70 performs control of the operations of various configurations of the article gripping system 110, including the container drive unit 54 and the gripping member drive mechanisms 30b, and combination calculations utilizing the weight values of the articles A weighed by the weighers 40.

The control unit 70 moves the unit drive units 10 and the container 50 to move the grippers 30 and the container 50 having the article group A1 placed therein closer to each other. The control unit 70 controls the gripping member drive mechanisms 30b of the grippers 30 to cause the gripping claws 30a of the grippers 30 to grip a portion of the articles A in the article group A1 placed in the container 50.

The weighers 40 measure the weight values of the articles A gripped by the grippers 30 corresponding to those weighers 40. The control unit 70 performs a combination calculation based on the weight values of the articles A gripped by the grippers 30 and weighed by the weighers 40.

The combination calculation is a process for finding a combination of weight values whose total value falls within a target weight range as a result of adding together the weight values of the articles A gripped by the grippers 30. The control unit 70, based on the result of the combination calculation, causes the gripping claws 30a of the grippers 30 corresponding to the combination of the weight values falling within the target weight range to release the articles A over the discharge chutes 60 and discharges from the discharge chutes 60 the articles A in the target weight range.

(2) Detailed Configurations

Figure 3:
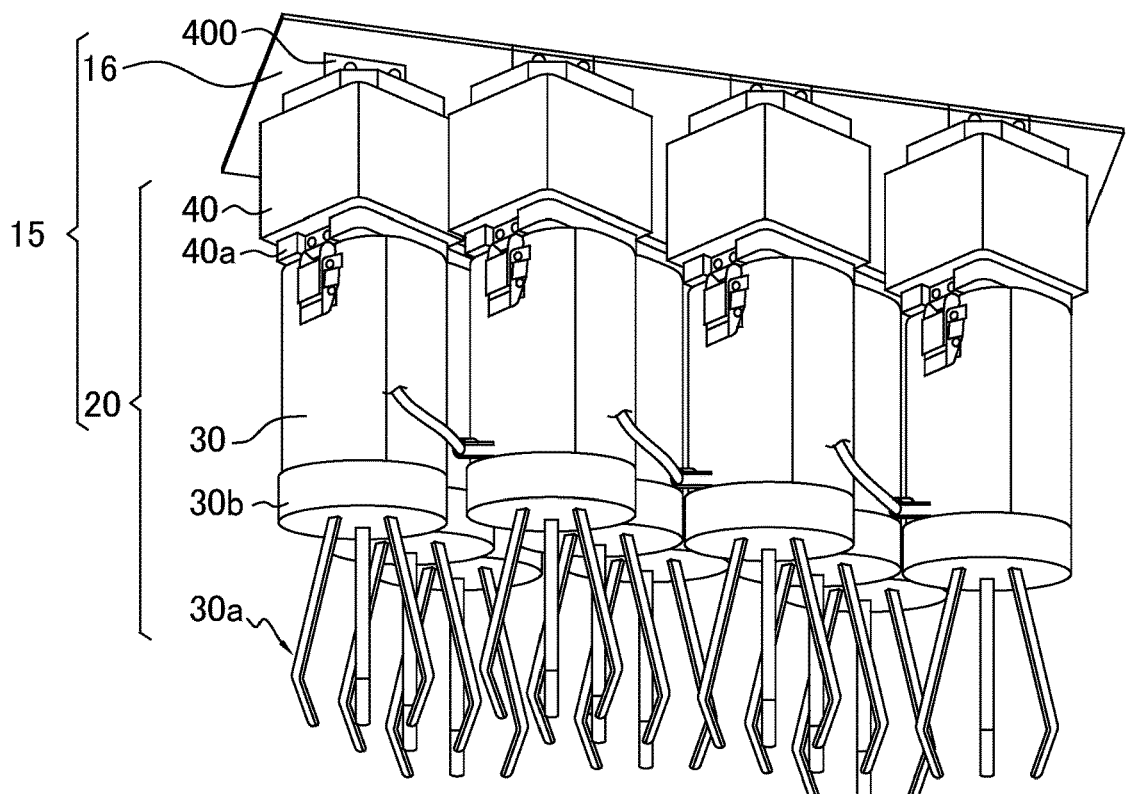
FIG. 3 is a schematic perspective view of a gripping unit.
Figure 4A:
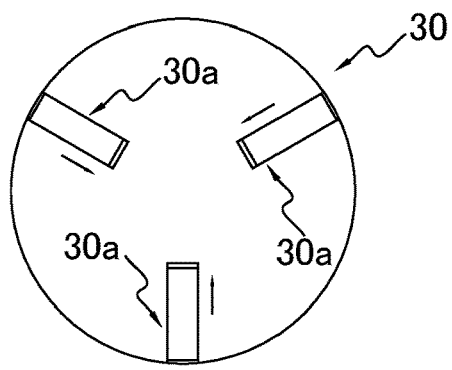
FIG. 4A is a bottom view, as viewed from below, of gripping members of a gripper.
Figure 4B:
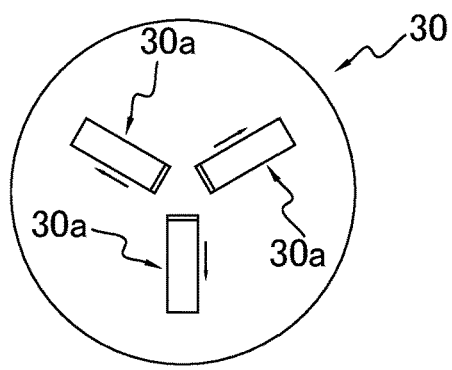
FIG. 4B is a bottom view, as viewed from below, of the gripping members of the gripper.

FIG. 3 is a schematic perspective view of a gripping unit 15. FIG. 4A and FIG. 4B are bottom views, as viewed from below, of the gripping claws 30a of a gripper 30. The unit drive units 10 and the gripping units 15 will be described below using FIG. 1A, FIG. 1B, FIG. 3, FIG. 4A, and FIG. 4B.

(2-1) Unit Drive Units 10

As shown in FIG. 1A, the article gripping system 110 includes two unit drive units 10. The unit drive unit 10 on the left side as viewed head-on in FIG. 1A will be called a first unit drive unit 10A, and the unit drive unit 10 on the right side as viewed head-on in FIG. 1A will be called a second unit drive unit 10B. However, when describing shared configurations and functions, they will simply be called the unit drive units 10.

The unit drive units 10 each have two frames 12 that extend parallel to each other and a forward and backward moving mechanism 11 that horizontally moves the gripping unit 15 along the frames 12. As shown in FIG. 1B, the unit drive units 10 can, using the forward and backward moving mechanisms 11, cause blocks 111 that hold the gripping units 15 to move in the direction of arrow D1 (forward) or arrow D2 (backward). The unit drive units 10 each have a servo motor 113 (see FIG. 9) that moves the block 111.

In this way, in the article gripping system 110, the first gripping unit 15A and the second gripping unit 15B are disposed in the horizontal direction, the first gripping unit 15A can be horizontally moved in forward and backward directions by the first unit drive unit 10A, and the second gripping unit 15B can be horizontally moved in forward and backward directions by the second unit drive unit 10B, so that the position of the article group in the container 50 and article gripping positions set for each of the gripping units 15 can be aligned.

Furthermore, instead of a servo motor, the unit drive units 10 may also each have an air cylinder capable of moving the block 111 in the direction of arrow D1 or arrow D2.

(2-2) Gripping Units 15

As shown in FIG. 1A, the article gripping system 110 includes two gripping units 15. The gripping unit 15 on the left side as viewed head-on in FIG. 1A will be called a first gripping unit 15A, and the gripping unit 15 on the right side as viewed head-on in FIG. 1A will be called a second gripping unit 15B. However, when describing shared configurations and functions, they will simply be called the gripping units 15.

The gripping units 15 each include a tabular coupling member 16 coupled to the block 111 of the unit drive unit 10 and one or more gripping modules 20.

(2-2-1) Coupling Member 16

The coupling member 16 is coupled to the block 111 of the unit drive unit 10 by screws, for example.

(2-2-2) Gripping Module 20

As shown in FIG. 3, the gripping module 20 is a device in which the gripper 30 and the weigher 40 are integrally assembled. The top surface of the weigher 40 is secured to the coupling member 16 via a mounting bracket 400, and the bottom surface of the weigher 40 has the gripper 30 secured to it.

(2-2-2-1) Gripper 30

The gripper 30 is a device that grips the articles A. Each gripper 30 has the gripping claws 30*a* and the gripping member drive mechanism 30*b* serving as a drive mechanism that drives the gripping claws 30*a*. The gripping member drive mechanism 30*b* drives the gripping claws 30*a* using, for example, a motor or fluid pressure as a drive source.

In the present embodiment, as shown in FIG. 3, the gripping claws 30*a* are each formed by bending the distal end of a rod-like or finger-like member inward so that it can catch onto the articles A. Each gripper 30 has a plurality (e.g., three) of the gripping claws 30*a*. It will be noted that the number and shape of the gripping claws 30*a* shown in FIG. 3, etc., are merely illustrative and can be appropriately changed.

As shown in FIG. 4A and FIG. 4B, when each gripper 30 is viewed from the gripping claw 30A side, the plural gripping claws 30*a* are arranged along a circumferential direction. Furthermore, when each gripper 30 is viewed from the gripping claw 30*a* side, the plural gripping claws 30*a* are arranged at generally regular intervals in the circumferential direction. Moreover, when each gripper 30 is viewed from the gripping claw 30*a* side, the gripping claws 30*a* are movable in a radial direction.

Furthermore, each gripper 30 holds and grips the articles A between the plural gripping claws 30A by using the gripping member drive mechanism 30*b* to move the gripping claws 30A that are away from each other inward in the radial direction so that they are close to each other.

Moreover, each gripper 30 releases the articles A by using the gripping member drive mechanism 30*b* to move the gripping claws 30*a* that are close to each other outward in the radial direction so that they are away from each other.

In other words, the plural gripping claws 30*a* of the gripping units 15 are switched to at least either of a first state and a second state. The first state is a state in which the relative distance between the gripping claws 30*a* is decreased to a first distance so that the gripping claws 30*a* grip the articles. The second state is a state in which the relative distance between the gripping claws 30*a* is increased to a second distance greater than the first distance so that the gripping claws 30*a* release the articles.

However, in a case where a gripping force limiting function is provided so that the articles A are not crushed by the gripping claws 30*a* or for the purpose of overload protection, the gripping claws 30*a* stop due to external force from the articles A before the relative distance between the gripping claws 30*a* is decreased to the first distance. Therefore, the first state does not invariably need to be a "state in which the relative distance between the gripping claws 30*a* is decreased to a first distance, and the first state may also be a state in which the relative distance between the gripping claws 30*a* is decreased to a distance at which the gripping claws 30*a* are able to grip the articles A.

(2-2-2-2) Weigher 40

Each gripping module 20 is provided with one weigher 40 for each gripper 30. The weigher 40 measures the weight value of the articles A being gripped by the gripping claws 30*a* of the corresponding gripper 30.

Each weigher 40 includes a sensor unit 40*a* (see FIG. 3) and an internal control unit not shown in the drawings. The sensor unit 40*a* includes a force sensor and an acceleration sensor. As the force sensor, for example, a strain gauge load cell is employed. As the acceleration sensor, for example, a strain gauge load cell or a MEMS small acceleration sensor is used.

The internal control unit of the weigher 40 measures the mass of the articles A being gripped by the gripper 30 based on force and acceleration measured by the sensor unit 40*a* when the gripper 30 gripping the articles A is moved in accompaniment with the movement of the unit drive unit 10. Specifically, the internal control unit of the weigher 40 measures the mass of the articles A being gripped by the gripper 30 by dividing the force measured by the force sensor by the acceleration measured by the acceleration sensor.

However, the weigher 40 is not limited to a method that weighs the mass of the articles A based on force and acceleration measured when the gripper 30 is moved. The weigher 40 may also be one that uses a load cell or the like to measure the weight of the articles A being gripped by the gripper 30 in a stationary state.

(2-3) Container 50

The container 50 contains the article group A1. As for the container 50, the container 50 is placed on a placement surface 52 that moves horizontally and moves vertically.

The grippers 30 grip a portion of the articles A from the article group A1 contained in the container 50. In the present embodiment, the container 50 is a cuboidal container whose top is open. The container 50 is configured in such a way that when the quantity of the articles A contained inside decreases, a human or a machine can replace the container 50 in which the quantity of the articles A inside has decreased with a container 50 that is new (that contains many articles A).

It will be noted that instead of configuring the container to be replaceable, the container 50 may also have an article supply mechanism for supplying the articles A to the container 50.

The container 50 is moved by the container drive unit 54 between a first position and a second position.

The first position is a position directly below the grippers 30 of the first gripping unit 15A and is a position where the grippers 30 of the first gripping unit 15A can grip the articles A in the container 50. When the container 50 is in the first position, the grippers 30 of the second gripping unit 15B cannot grip the articles A in the container 50.

The second position of the container 50 is a position directly below the grippers 30 of the second gripping unit 15B and is a position where the grippers 30 of the second gripping unit 15B can grip the articles A in the container 50. When the container 50 is in the second position, the grippers 30 of the first gripping unit 15A cannot grip the articles A in the container 50.

(2-4) Container Drive Unit 54

Figure 5A:
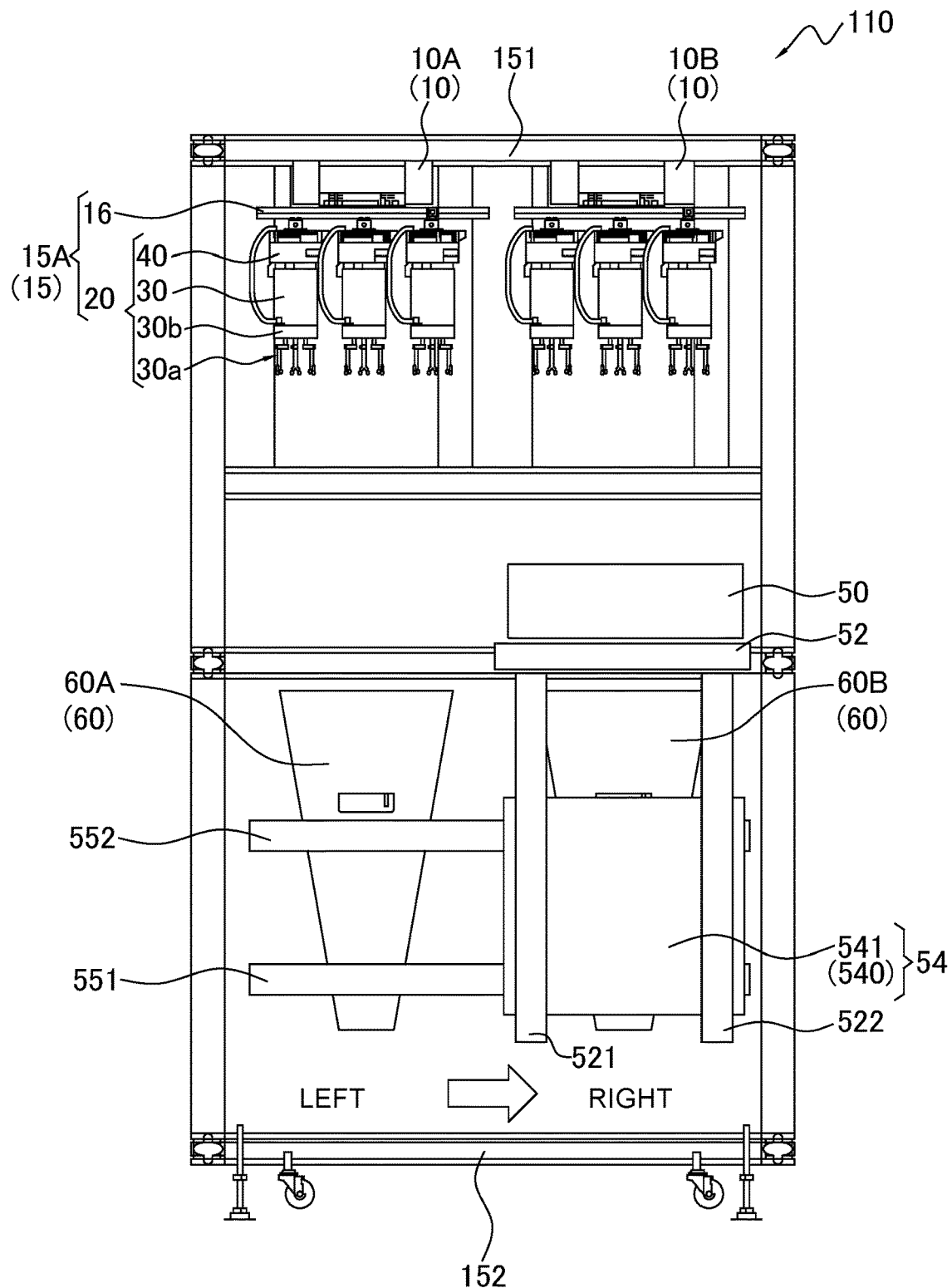
FIG. 5A is a front view of the article gripping system of FIG. 1A when a container of the article gripping system has moved horizontally rightward.
Figure 5B:
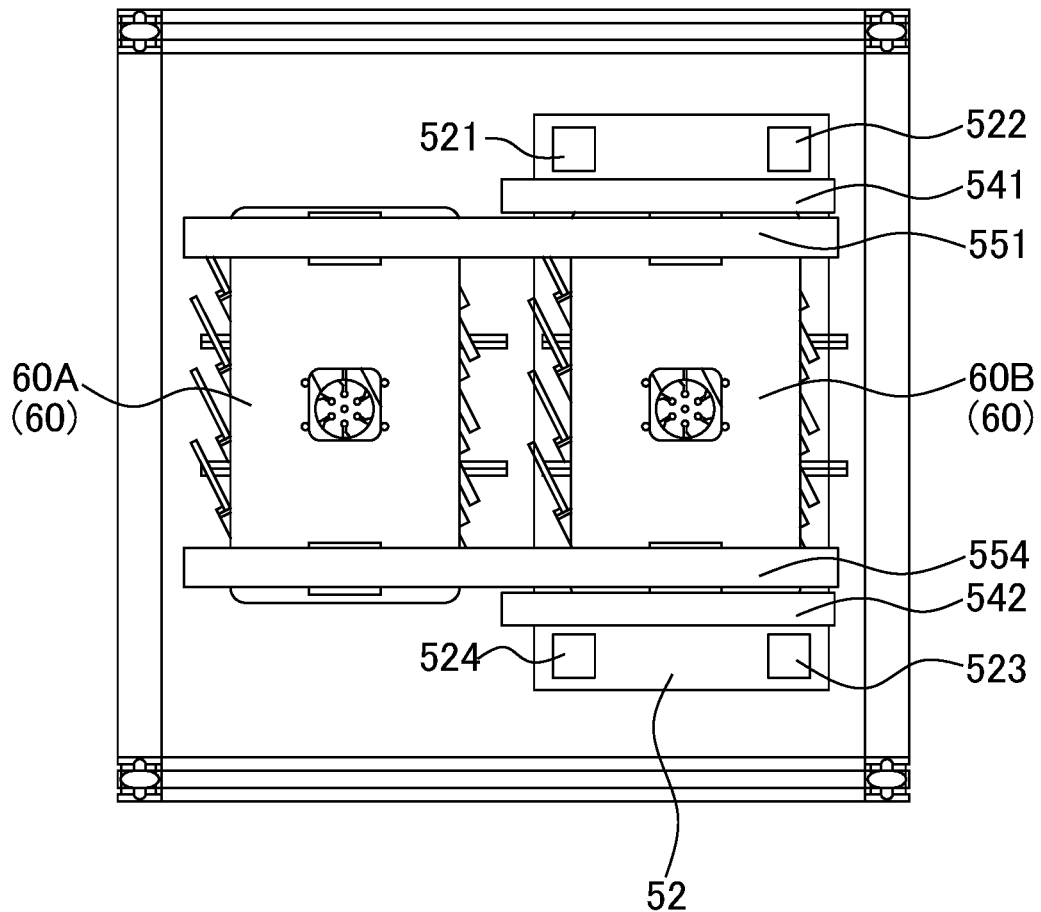
FIG. 5B is a bottom view, when viewed from directly below, of the article gripping system of FIG. 5A.

FIG. 5A is a front view of the article gripping system 110 of FIG. 1A when the container 50 of the article gripping system 110 has moved horizontally rightward. FIG. 5B is a bottom view, when viewed from directly below, of the article gripping system 110 of FIG. 5A.

In FIG. 5A and FIG. 5B, the container drive unit 54 can horizontally move the container 50 using a motor or fluid pressure as a drive source.

As shown in FIG. 1A, FIG. 1B, FIG. 5A, and FIG. 5B, the container drive unit 54 has two cuboidal drivers 540. When the near side as viewed head-on in FIG. 1A is taken as the front, the driver located in front of the two discharge chutes 60 is a first driver 541 and the driver located in back of the two discharge chutes 60 is a second driver 542.

Furthermore, as shown in FIG. 1A and FIG. 1B, two horizontal supports are provided one above the other and parallel to each other in front of the two discharge chutes 60, and two horizontal supports are also provided one above the other and parallel to each other in back. As viewed head-on in FIG. 1B, the support on the lower left side is a first horizontal support 551, followed clockwise by a second horizontal support 552, a third horizontal support 553, and a fourth horizontal support 554. Consequently, the horizontal support on the lower side as viewed head-on in FIG. 1A is the first horizontal support 551 and the horizontal support on the upper side is the second horizontal support 552.

The first driver 541 of the container drive unit 54 has a leftward and rightward moving mechanism 56 (see FIG. 10A and FIG. 10B) and can horizontally move along the first horizontal support 551 and the second horizontal support 552. Furthermore, the second driver 542 of the container drive unit 54 also has a leftward and rightward moving mechanism 56 and can horizontally move along the third horizontal support 553 and the fourth horizontal support 554. The first driver 541 and the second driver 542 move in synchronization with each other.

In this way, in the article gripping system 110, the first gripping unit 15A and the second gripping unit 15B are disposed in the horizontal direction, the container 50 can be horizontally moved in leftward and rightward directions by the leftward and rightward moving mechanisms 56, so the position of the article group A1 in the container 50 and the article gripping positions set for each of the gripping units 15 can be aligned.

FIG. 6 is a side view of the article gripping system 110 of FIG. 5A when the container 50 of the article gripping system 110 has moved vertically upward. In FIG. 6, the container drive unit 54 can vertically move the container 50 using a motor or fluid pressure as a drive source.

As shown in FIG. 1A, FIG. 1B, and FIG. 1D, the placement surface 52 has four vertical supports that extend vertically downward from the four corners of its undersurface. As viewed head-on in FIG. 1D, the support on the upper left side is a first vertical support 521, followed clockwise by a second vertical support 522, a third vertical support 523, and a fourth vertical support 524. Consequently, the support on the left side as viewed head-on in FIG. 1A is the first vertical support 521 and the support on the right side is the second vertical support 522. Furthermore, the support on the right side as viewed head-on in FIG. 1B is the third vertical support 523.

The first driver 541 has a vertical moving mechanism 57 (FIG. 10A and FIG. 10B), and the first vertical support 521 and the second vertical support 522 can be moved in the vertical direction. Furthermore, the second driver 542 also has a vertical moving mechanism 57, and the third vertical support 523 and the fourth vertical support 524 can be moved in the vertical direction. The first driver 541 and the second driver 542 can cause the first vertical support 521 and second vertical support 522 and the third vertical support 523 and fourth vertical support 524 to move in synchronization with each other in the vertical direction.

In this way, in the article gripping system 110, the container 50 can be moved in upward and downward directions by the vertical moving mechanisms 57, so even in a case where the container 50 is disposed away from the gripping units 15 in the vertical direction, the position of the article group A1 in the container 50 and the article gripping positions set for each of the gripping units 15 can be aligned.

Furthermore, in the article gripping system 110, the vertical moving mechanisms 57 do not need to raise and lower the leftward and rightward moving mechanisms 56 and need only raise and lower just the container 50, so the load when raising and lowering the container 50 is mitigated.

Moreover, in the article holding system 110, the leftward and rightward moving mechanisms 56 are not disposed in the space above the inlets of the discharge chutes 60, so contamination of the discharge chutes 60 is avoided. Likewise, the vertical moving mechanisms 57 are not disposed in the space above the inlets of the discharge chutes 60, so contamination of the discharge chutes 60 is avoided.

It will be noted that, as a contamination prevention measure, it is also possible to provide a cover for countering contamination and dispose it above the discharge chutes 60, in addition to the configuration described above where the leftward and rightward moving mechanisms 56 and the vertical moving mechanisms 57 are not disposed in the space above the inlets of the discharge chutes 60.

(2-5) Discharge Chutes 60

As shown in FIG. 1A, the article gripping system 110 includes two discharge chutes 60. The discharge chute 60 on the left side as viewed head-on in FIG. 1A will be called a first discharge chute 60A, and the discharge chute 60 on the right side as viewed head-on in FIG. 1A will be called a second discharge chute 60B. However, when describing shared configurations and functions, they will simply be called the discharge chutes 60.

The discharge chutes 60 are funnel-shaped members. The discharge chutes 60 are disposed directly below the gripping units 15. Specifically, the first discharge chute 60A is disposed directly below the first gripping unit 15A, and the second discharge chute 60B is disposed directly below the second gripping unit 15B.

The container 50 is disposed between the first gripping unit 15A and the first discharge chute 60A or between the second gripping unit 15B and the second discharge chute 60B.

When the container 50 is positioned between the second gripping unit 15B and the second discharge chute 60B, the first discharge chute 60A receives, and discharges outside the article gripping system 110, the articles A released and dropped by the grippers 30 of the first gripping unit 15A.

Likewise, when the container 50 is positioned between the first gripping unit 15A and the first discharge chute 60A, the second discharge chute 60B receives, and discharges outside the article gripping system 110, the articles A released and dropped by the grippers 30 of the second gripping unit 15B.

Although in the present embodiment the article gripping system 110 uses two discharge chutes, it is not limited to this, and the first gripping unit 15A and the second discharge unit 15B sometimes also share one discharge chute. Furthermore, it is also possible to discharge the articles A directly to the outside without using discharge chutes.

(2-6) Control Unit 70

The control unit 70 has a CPU and memories such as a ROM and a RAM that are not shown in the drawings. As shown in FIG. 2, the control unit 70 is electrically connected to the unit drive units 10, the gripping member drive mechanisms 30b, the weighers 40, and the container drive unit 54.

The control unit 70, as a result of the CPU executing programs stored in the memories, performs control of the operations of various configurations of the article holding system 110, such as the unit drive units 10, the gripping member drive mechanisms 30b, and the container drive unit 54, and combination calculations utilizing the weight values of the articles A weighed by the weighers 40.

It will be noted that the various functions of the control unit 70 do not need to be realized by software and, even when they are realized by hardware, may also be realized by the cooperation of hardware and software.

The control unit 70 drives the gripping claws 30a via the gripping member drive mechanisms 30b, causes the gripping claws 30a to grip the articles A, and thereafter causes the gripping claws 30a to release the articles A. Here, "to grip" means that the plural gripping claws 30a that are in positions away from each other such as shown in FIG. 4A move inward in the radial direction to positions close to each other such as shown in FIG. 4B, and "to release" means that after gripping the articles A the gripping claws 30a return again to positions away from each other such as shown in FIG. 4A.

(3) Operation of Article Gripping System

The operation of the article gripping system 110 controlled by the control unit 70 will be described with reference to the drawings. It will be noted that although here gripping units 15 each having a plurality of gripping modules 20 are described as an example, the description can also be applied to gripping units 15 each including a single gripping module 20.

Figure 7:
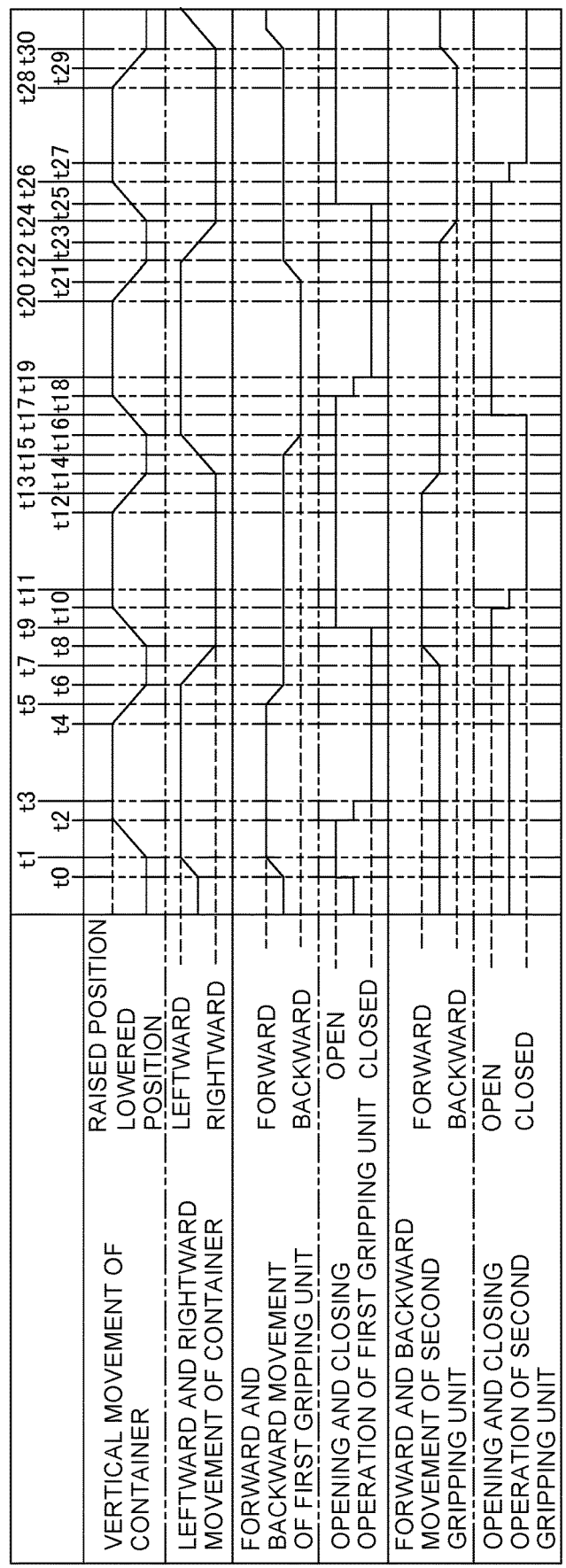
FIG. 7 is a timing diagram of operations of the article gripping system.
Figure 8A:
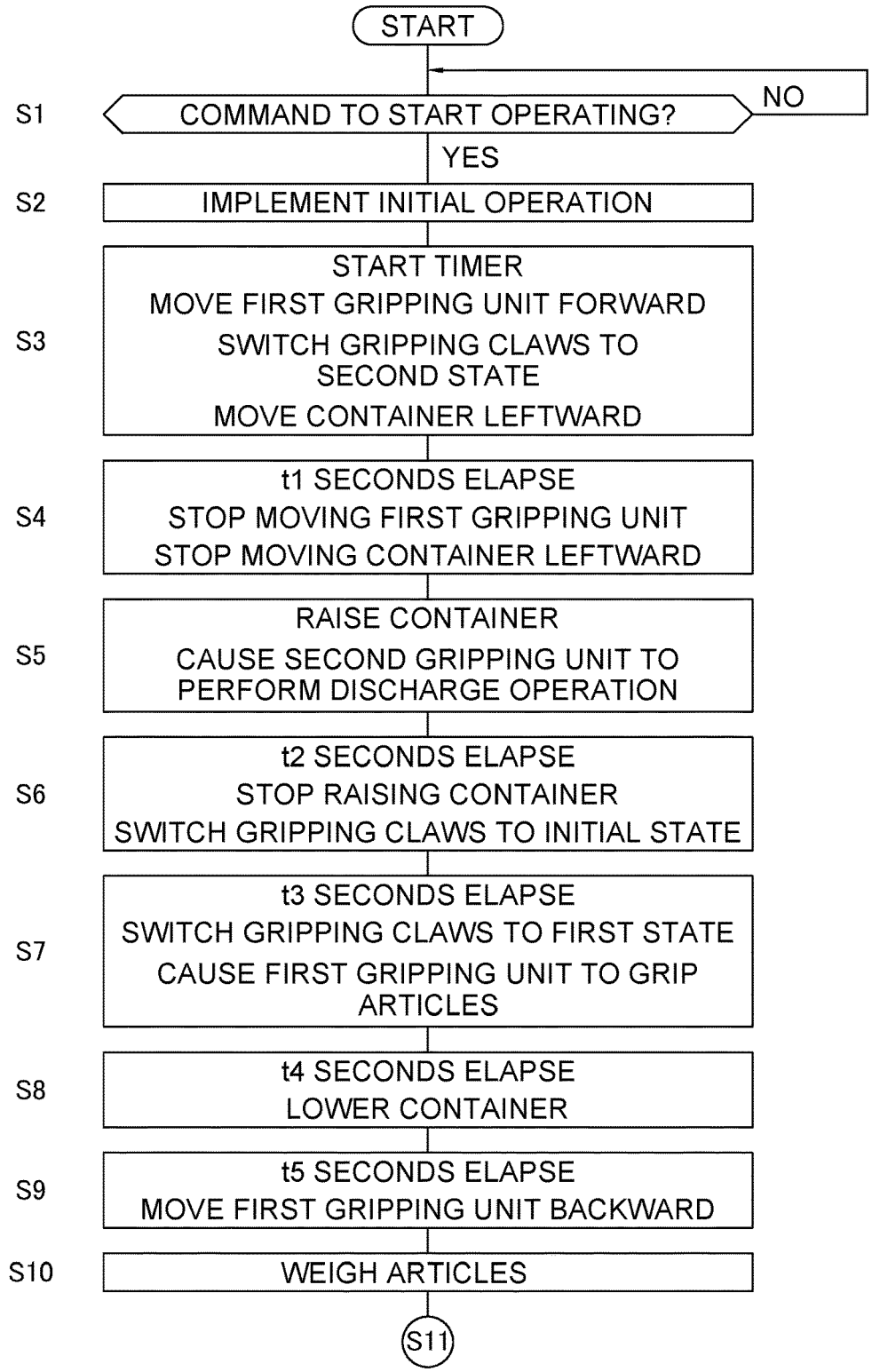
FIG. 8A is a flowchart of operations of the article gripping system.
Figure 8B:
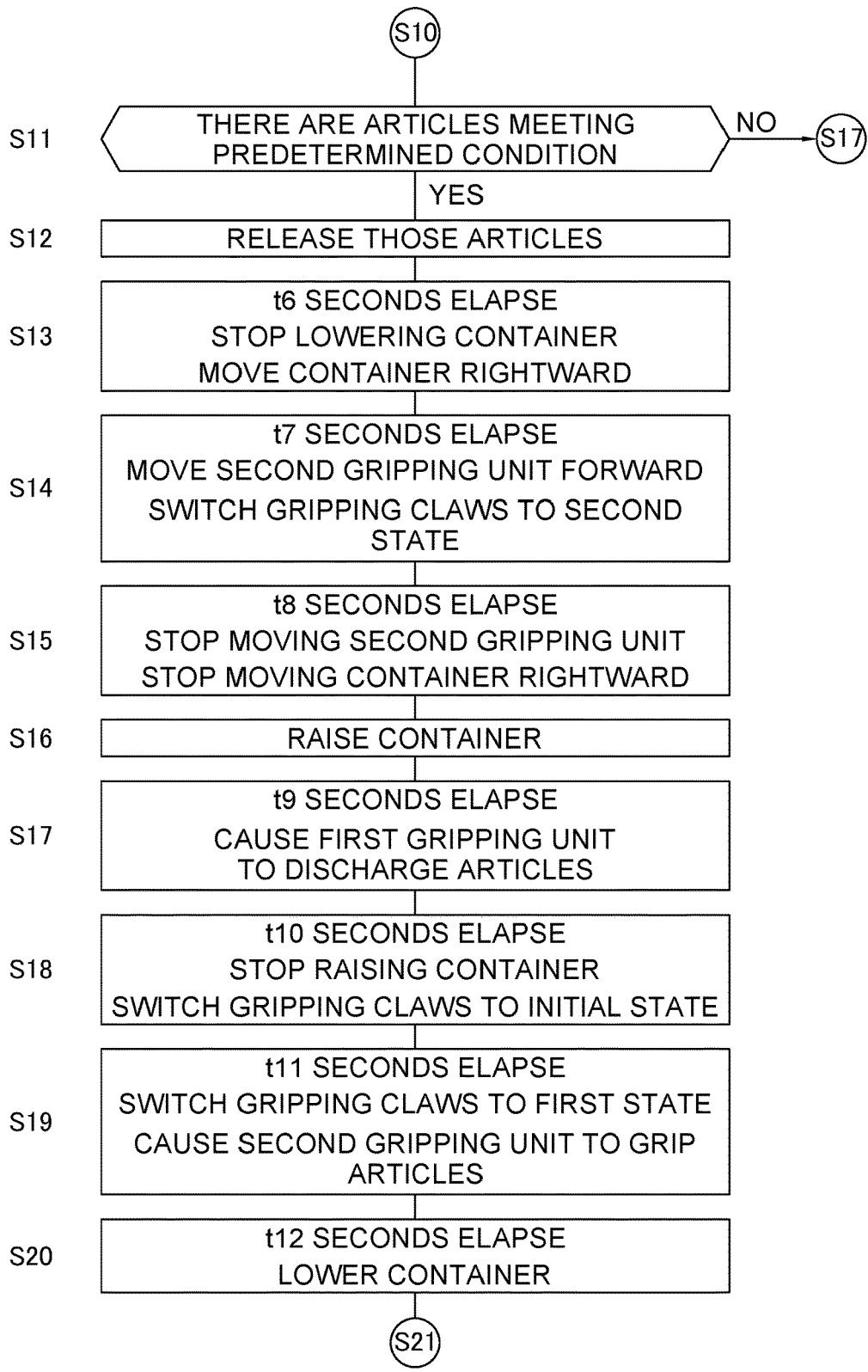
FIG. 8B is a flowchart of operations of the article gripping system.
Figure 8C:
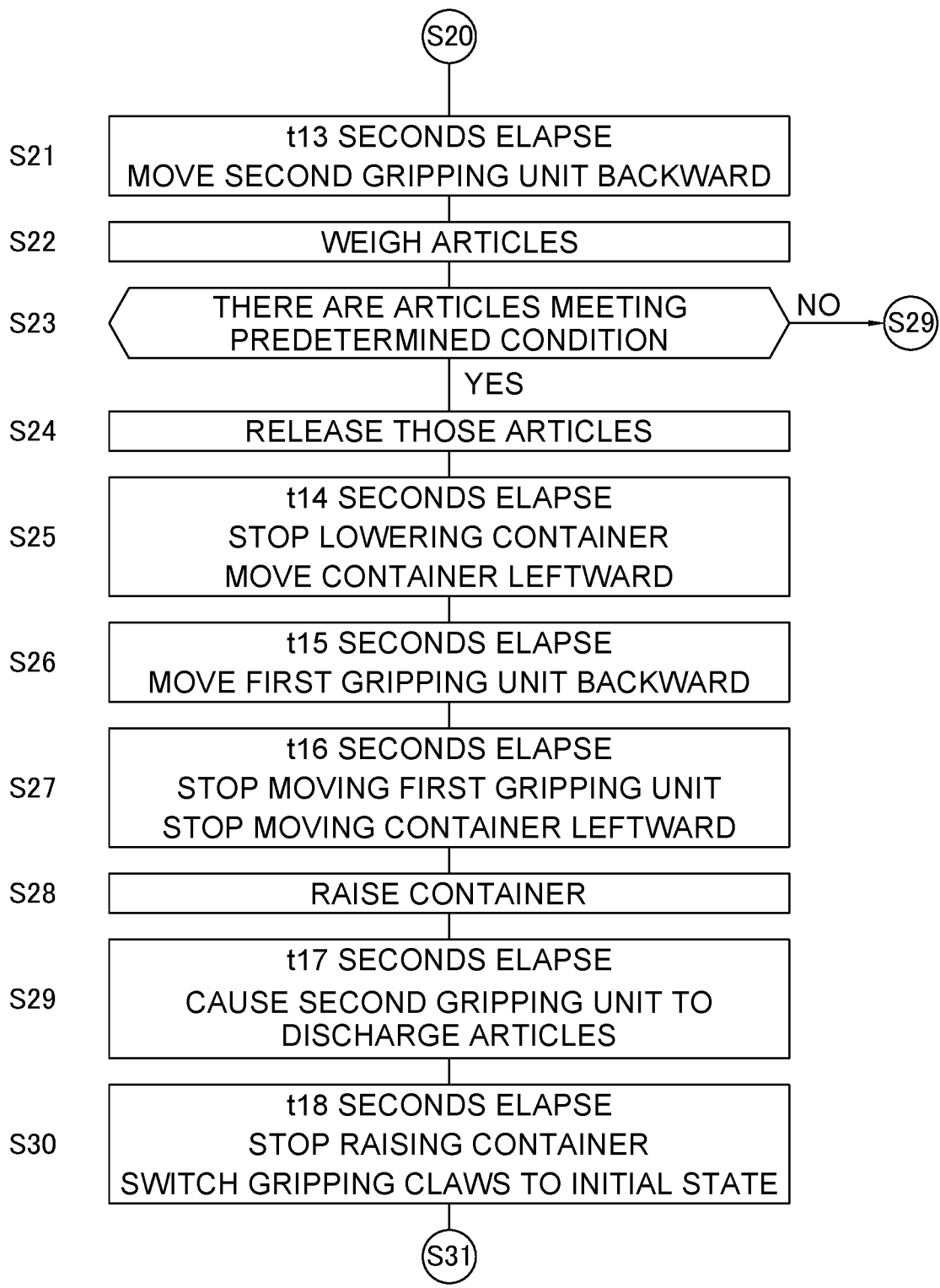
FIG. 8C is a flowchart of operations of the article gripping system.
Figure 8D:
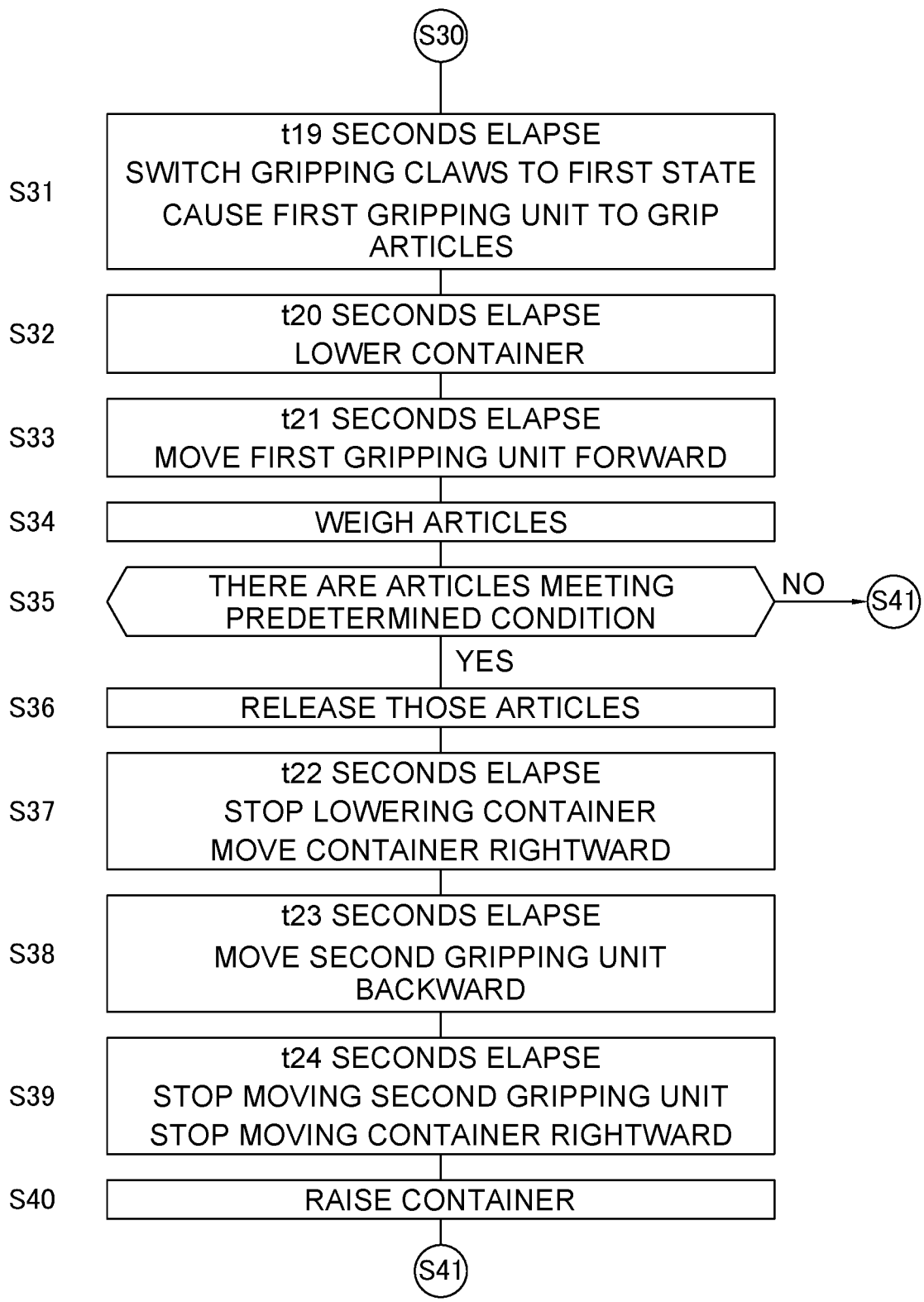
FIG. 8D is a flowchart of operations of the article gripping system.
Figure 8E:
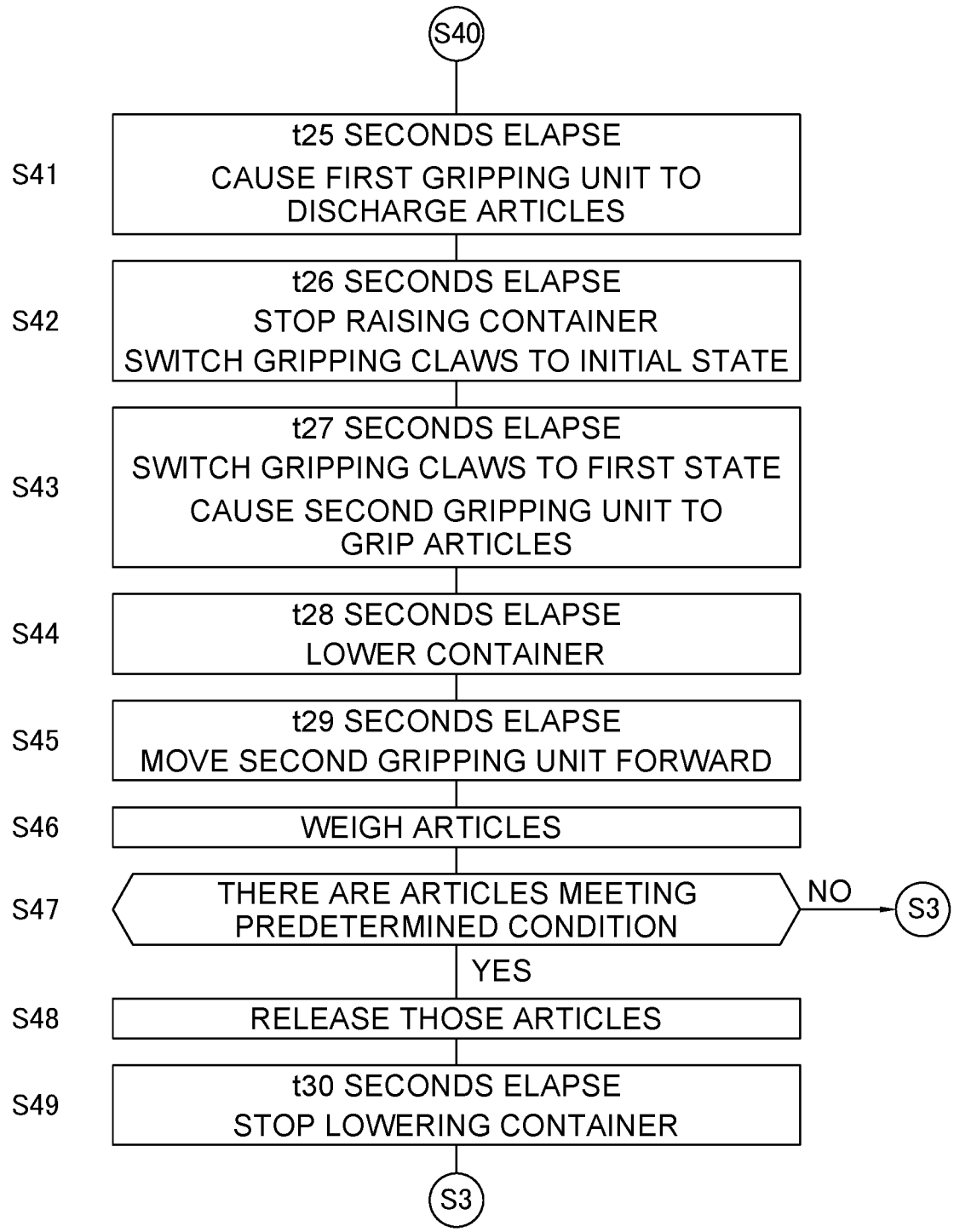
FIG. 8E is a flowchart of operations of the article gripping system.

FIG. 7 is a timing diagram of operations of the article gripping system 110. Furthermore, FIG. 8A to FIG. 8E are flowcharts of operations of the article gripping system 110.

In FIG. 7, the uppermost timing diagram shows the position, in the up and down direction, of the container 50. The timing diagram that is second from the top shows the position, in the left and right direction, of the container 50 as viewed head-on in FIG. 5A.

The timing diagram that is third from the top shows the position, in the front and rear direction, of the first gripping unit 15A, with the near side as viewed head-on in FIG. 5A being taken as the front. The timing diagram that is fourth from the top shows the open and closed states of the first gripping unit 15A. The timing diagram that is fifth from the top shows the position, in the front and rear direction, of the second gripping unit 15B. The timing diagram that is sixth from the top shows the open and closed states of the second gripping unit 15B.

In FIG. 7, the left side of time t0 is a state in which operation is stopped, and is the state shown in FIG. 5A. Time t0 is the point in time when the first gripping unit 15A starts moving forward and the container 50 starts moving leftward.

(Step S1)

First, the control unit 70 judges whether or not there is a command to start operating, and proceeds to step S2 when there is a command to start operating.

(Step S2)

Figure 4C:
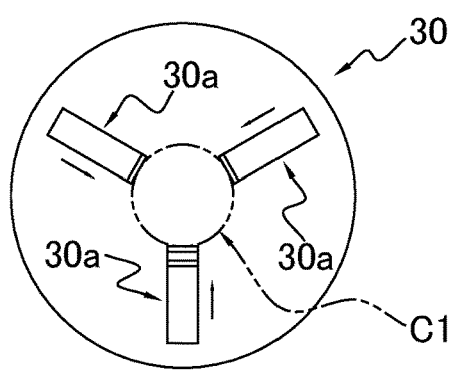
FIG. 4C is a bottom view, as viewed from below, of the gripping members of the gripper.

Next, the control unit 70 performs an initial operation. Because of the initial operation, the first gripping unit 15A and the second gripping unit 15B are moved to unit initial positions shown in FIG. 1B. Furthermore, because of the initial operation, the gripping claws 30a of the grippers 30 switch to an initial state in which they close as far as the position of a virtual circle C1 shown in FIG. 4C. Moreover, because of the initial operation, the container 50 moves to a container initial position shown in FIG. 5A.

The control unit 70 performs the initial operation for a fixed amount of time even if the first gripping unit 15A and the second gripping unit 15B are right from the start in the unit initial positions and even if the gripping claws 30a are right from the start in the initial state and even if the container 50 is right from the start in the container initial position. When the initial operation is completed, the control unit 70 proceeds to step S3.

(Step S3)

Next, the control unit 70 starts counting time with a timer and at the same time moves the first gripping unit 15A forward, switches the gripping claws 30a of the grippers 30 from the initial state to a second state (an open state), and moves the container 50 leftward. The control unit 70 marks this point in time as t0.

(Step S4)

Next, when t1 seconds elapse since t0, the control unit 70 stops moving the first gripping unit 15A forward and stops moving the container 50 leftward.

At this time, the container 50 is positioned below the first gripping unit 15A. Furthermore, as viewed from the container 50, the first gripping unit 15A is entirely positioned above a region offset toward the front side of the inside of the container 50.

(Step S5)

Next, the control unit 70 raises the container 50. At this time, the control unit 70 causes the second gripping unit 15B to perform a discharge operation, but the first time is an empty discharge. In the timing diagram of FIG. 7, the container 50 moves upward at the same time as time t1 when it stops moving leftward. However, the control unit 70 may also start moving the container 50 upward between time t0 and time t1.

At this time, the control unit 70 performs an operation to switch the state of the gripping claws 30a of the second gripping unit 15B to the second state (an open state) and release the articles A. This is because it is necessary to discharge here the articles A that were finally gripped by the second gripping unit 15B, because the flow of this operation cycles from step S3 to step S49 as one cycle.

(Step S6)

Next, when t2 seconds elapse since t0, the control unit 70 stops raising the container 50. At this time, the container 50 reaches a position directly below the first gripping unit 15A where the gripping claws 30a of the grippers 30 can grip the articles A in the container 50. In this position, the gripping claws 30a are in the article group A1 in the container 50, and at the same time the gripping claws 30a return to the initial state.

Here, in the article gripping system 110, the control unit 70 finishes moving the container 50 leftward or rightward and moving the unit drive units 10 forward or backward before the container 50 finishes rising, so the article group A1 in the container 50 is kept from ending up being shifted in either forward and backward or leftward and rightward directions.

Furthermore, in the article gripping system 110, the control unit 70 switches the gripping claws 30a to the second state (an open state in which the gripping claws 30a are open) before the container 50 finishes rising, so the articles A in the container 50 are kept from ending up being shifted to the outer sides of the gripping claws 30a.

(Step S7)

Next, when t3 seconds elapse since t0, the control unit 70 switches the gripping claws 30a from the initial state to the first state (a closed state) to cause the gripping claws 30a to grip the articles A.

In this way, in the article gripping system 110, the gripping claws 30a are switched to the first state (a closed state in which the gripping claws 30a are closed) in a state in which the gripping claws 30a are in the middle of the article group A1 in the container 50, so the articles A can be reliably held.

Preferably, the control unit 70 causes the plural grippers 30 to grip the articles A at the same time. However, the control unit 70 is not limited to this and may also cause the plural grippers 30 to grip the articles A at different timings.
(Step S8)

Next, when t4 seconds elapse since t0, the control unit 70 lowers the container 50 while maintaining the state in which the plural grippers 30 are gripping the articles A.
(Step S9)

Next, when t5 seconds elapse since t0, the control unit 70 moves the first gripping unit 15A backward. The gripping claws 30a and the article group A1 in the container 50 are away from each other as a result of the container 50 moving downward a predetermined distance between time t4 and time t5, so even when the first gripping unit 15A moves backward, the articles A gripped by the gripping claws 30a and the article group A1 in the container 50 do not interfere with each other.
(Step S10)

Next, the control unit 70 measures the weights of the articles A gripped by the grippers 30 corresponding to the weighers 40 of the first gripping unit 15A.

In this way, because the article gripping system 110 is a type where the container 50 moves upward, downward, leftward, and rightward and the gripping units 15 move forward and backward, the gripping units 15 can move in advance in forward and backward directions before gripping the articles A and weigh the articles A right after gripping hold of them.
(Step S11)

Next, the control unit 70 determines whether or not at least one of the weighing results of the weighers 40 meets a predetermined condition for returning the articles A gripped by the grippers 30 to the container 50 without discharging them to the discharge chute 60.

Here, the predetermined condition specifically is a condition where the weight values of the articles A weighed by the weighers 40 are not a preset target weight value. In the case of combination weighing utilizing the weight values of the articles A weighed by the weighers 40, as a result of the combination calculation the weight values of the articles A gripped by the grippers 30 that will not participate in discharge are also not the target weight value and meet the predetermined condition.

The control unit 70 moves to step S17 when it determines that none of the weighing results of the weighers 40 meet the predetermined condition.
(Step S12)

Next, the control unit 70 controls the gripping member drive mechanisms 30b of the grippers 30 meeting the predetermined condition to cause those grippers 30 to release the articles A.

In other words, if there are grippers 30 gripping articles A whose weight values are not the target weight value, the control unit 70 causes those grippers 30 to release the articles A and drop the articles A into the container 50. The articles A that have dropped into the container 50 are reutilized as the articles A in the article group A1.

Meanwhile, the control unit 70 causes the grippers 30 gripping the articles A whose weight values are the target weight value to maintain their grip.

(Step S13)

Next, when t6 seconds elapse since t0, the control unit 70 stops lowering the container 50 and at the same time moves the container 50 rightward.
(Step S14)

Next, when t7 seconds elapse since t0, the control unit 70 moves the second gripping unit 15B forward and switches the gripping claws 30a of the grippers 30 from the initial state to the second state (an open state). The control unit 70 continues to move the container 50 rightward.
(Step S15)

Next, when t8 seconds elapse since t0, the control unit 70 stops moving the second gripping unit 15B forward and stops moving the container 50 rightward.

At this time, the container 50 is positioned below the second gripping unit 15B. Furthermore, as viewed from the container 50, the second gripping unit 15B is entirely positioned above a region offset toward the front side of the inside of the container 50.
(Step S16)

Next, the control unit 70 raises the container 50. In the timing diagram of FIG. 7, the container 50 moves upward at the same time as time t8 when it stops moving rightward. However, the control unit 70 may also start moving the container 50 upward between time t7 and time t8.
(Step S17)

Next, when t9 seconds elapse since t0, the control unit 70 switches the gripping claws 30a of the first gripping unit 15A that are gripping the articles A whose weight values were the target weight value in prior step S12 from the first state (a closed state) to the second state (an open state) to cause the gripping claws 30a of the first gripping unit 15A to release the articles A and discharge the articles A to the first discharge chute 60A below.

In this way, the positional relationship between the gripping units 15 and the container 50 is a second positional relationship in which the container 50 obstructs discharge of the articles gripped by the second gripping unit 15B but does not obstruct discharge of the articles gripped by the first gripping unit 15A.
(Step S18)

Next, when t10 seconds elapse since t0, the control unit 70 stops raising the container 50. At this time, the container 50 reaches a position directly below the second gripping unit 15B where the gripping claws 30a of the grippers 30 can grip the articles A in the container 50. In this position, the gripping claws 30a are in the article group A1 in the container 50, and at the same time the gripping claws 30a return to the initial state.

Here also, the control unit 70 finishes moving the container 50 leftward or rightward and moving the unit drive units 10 forward or backward before the container 50 finishes rising, so the article group A1 in the container 50 is kept from ending up being shifted in either forward and backward or leftward and rightward directions.

Furthermore, the control unit 70 switches the gripping claws 30a to the second state (an open state in which the gripping claws 30a are open) before the container 50 finishes rising, so the articles A in the container 50 can be kept from ending up being shifted to the outer sides of the gripping claws 30a.
(Step S19)

Next, when t11 seconds elapse since t0, the control unit 70 switches the gripping claws 30a of the second gripping unit 15B from the initial state to the first state (a closed state) to cause the gripping claws 30a to grip the articles A.

In this way, in the article gripping system 110, the gripping claws 30a are switched to the first state (a closed state in which the gripping claws 30a are closed) in a state in which the gripping claws 30a are in the middle of the article group A1 in the container 50, so the articles A can be reliably held.

(Step S20)

Next, when t12 seconds elapse since t0, the control unit 70 lowers the container 50 while maintaining the state in which the plural grippers 30 of the second gripping unit 15B are gripping the articles A.

(Step S21)

Next, when t13 seconds elapse since to, the control unit 70 moves the second gripping unit 15B backward. The gripping claws 30a and the article group A1 in the container 50 are away from each other as a result of the container 50 moving downward a predetermined distance between time t12 and time t13, so even when the second gripping unit 15B moves backward, the articles A gripped by the gripping claws 30a and the article group A1 in the container 50 do not interfere with each other.

(Step S22)

Next, the control unit 70 measures the weights of the articles A gripped by the grippers 30 corresponding to the weighers 40 of the second gripping unit 15B. In this way, because the article gripping system 110 is a type where the container 50 moves upward, downward, leftward, and rightward and the gripping units 15 move forward and backward, the gripping units 15 can move in advance in forward and backward directions before gripping the articles A and weigh the articles A right after gripping hold of them.

(Step S23)

Next, the control unit 70 determines whether or not at least one of the weighing results of the weighers 40 meets a predetermined condition for returning the articles A gripped by the grippers 30 to the container 50 without discharging them to the discharge chute 60.

The predetermined condition specifically is a condition where the weight values of the articles A weighed by the weighers 40 are not a preset target weight value.

The control unit 70 moves to step S29 when it determines that none of the weighing results of the weighers 40 meet the predetermined condition.

(Step S24)

Next, the control unit 70 controls the gripping member drive mechanisms 30b of the grippers 30 meeting the predetermined condition to cause those grippers 30 to release the articles A.

In other words, if there are grippers 30 gripping articles A whose weight values are not the target weight value, the control unit 70 causes those grippers 30 to release the articles A and drop the articles A into the container 50. The articles A that have dropped into the container 50 are reutilized as the articles A in the article group A1.

Meanwhile, the control unit 70 causes the grippers 30 gripping the articles A whose weight values are the target weight value to maintain their grip.

(Step S25)

Next, when t14 seconds elapse since t0, the control unit 70 stops lowering the container 50 and at the same time moves the container 50 leftward.

(Step S26)

Next, when t15 seconds elapse since t0, the control unit 70 moves the first gripping unit 15A backward. The control unit 70 continues to move the container 50 leftward.

(Step S27)

Next, when t16 seconds elapse since t0, the control unit 70 stops moving the first gripping unit 15A backward and stops moving the container 50 leftward.

At this time, the container 50 is positioned below the first gripping unit 15A. Furthermore, as viewed from the container 50, the first gripping unit 15A is entirely positioned above a region offset toward the rear side of the inside of the container 50.

(Step S28)

Next, the control unit 70 raises the container 50. In the timing diagram of FIG. 7, the container 50 moves upward at the same time as time t16 when it stops moving rightward. However, the control unit 70 may also start moving the container 50 upward between time t15 and time t16.

(Step S29)

Next, when t17 seconds elapse since t0, the control unit 70 switches the state of the gripping claws 30a of the second gripping unit 15B that are gripping the articles A whose weight values were the target weight value in prior step S24 from the first state (a closed state) to the second state (an open state) to cause the gripping claws 30a of the second gripping unit 15B to release the articles A and discharge the articles A to the second discharge chute 60B below.

In this way, the positional relationship between the gripping units 15 and the container 50 is a first positional relationship in which the container 50 obstructs discharge of the articles gripped by the first gripping unit 15A but does not obstruct discharge of the articles gripped by the second gripping unit 15B.

(Step S30)

Next, when t18 seconds elapse since t0, the control unit 70 stops raising the container 50. At this time, the container 50 reaches a position directly below the first gripping unit 15A where the gripping claws 30a of the grippers 30 can grip the articles A in the container 50. In this position, the gripping claws 30a are in the article group A1 in the container 50, and at the same time the gripping claws 30a return to the initial state.

Here also, the control unit 70 finishes moving the container 50 leftward or rightward and moving the unit drive units 10 forward or backward before the container 50 finishes rising, so the article group A1 in the container 50 is kept from ending up being shifted in either forward and backward or leftward and rightward directions.

Furthermore, the control unit 70 switches the gripping claws 30a to the second state (an open state in which the gripping claws 30a are open) before the container 50 finishes rising, so the articles A in the container 50 are kept from ending up being shifted to the outer sides of the gripping claws 30a.

(Step S31)

Next, when t19 seconds elapse since t0, the control unit 70 switches the gripping claws 30a of the first gripping unit 15A from the initial state to the first state (a closed state) to cause the gripping claws 30a to grip the articles A.

In this way, in the article gripping system 110, the gripping claws 30a are switched to the first state (a closed state in which the gripping claws 30a are closed) in a state in which the gripping claws 30a are in the middle of the article group A1 in the container 50, so the articles A can be reliably held.

(Step S32)

Next, when t20 seconds elapse since t0, the control unit 70 lowers the container 50 while maintaining the state in which the plural grippers 30 are gripping the articles A.

(Step S33)

Next, when t21 seconds elapse since t0, the control unit 70 moves the first gripping unit 15A forward. The gripping claws 30a and the article group A1 in the container 50 are away from each other as a result of the container 50 moving downward a predetermined distance between time t20 and time t21, so even when the first gripping unit 15A moves forward, the articles A gripped by the gripping claws 30a and the article group A1 in the container 50 do not interfere with each other.

(Step S34)

Next, the control unit 70 measures the weights of the articles gripped by the grippers 30 corresponding to the weighers 40 of the first gripping unit 15A. In this way, because the article gripping system 110 is a type where the container 50 moves upward, downward, leftward, and rightward and the gripping units 15 move forward and backward, the gripping units 15 can move in advance in forward and backward directions before gripping the articles A and weigh the articles A right after gripping hold of them.

(Step S35)

Next, the control unit 70 determines whether or not at least one of the weighing results of the weighers 40 meets a predetermined condition for returning the articles A gripped by the grippers 30 to the container 50 without discharging them to the discharge chute 60.

Here, the predetermined condition specifically is a condition where the weight values of the articles A weighed by the weighers 40 are not a preset target weight value.

The control unit 70 proceeds to step S41 when it determines that none of the weighing results of the weighers 40 meet the predetermined condition.

(Step S36)

Next, the control unit 70 controls the gripping member drive mechanisms 30b of the grippers 30 meeting the predetermined condition to cause those grippers 30 to release the articles A.

In other words, if there are grippers 30 gripping articles A whose weight values are not the target weight value, the control unit 70 causes those grippers 30 to release the articles A and drop the articles A into the container 50. The articles A that have dropped into the container 50 are reutilized as the articles A in the article group A1.

Meanwhile, the control unit 70 causes the grippers 30 gripping the articles A whose weight values are the target weight value to maintain their grip.

(Step S37)

Next, when t22 seconds elapse since t0, the control unit 70 stops lowering the container 50 and at the same time moves the container 50 rightward.

(Step S38)

Next, when t23 seconds elapse since t0, the control unit 70 moves the second gripping unit 15B backward. The control unit 70 continues to move the container 50 rightward.

(Step S39)

Next, when t24 seconds elapse since t0, the control unit 70 stops moving the second gripping unit 15B backward and stops moving the container 50 rightward.

At this time, the container 50 is positioned below the second gripping unit 15B. Furthermore, as viewed from the container 50, the second gripping unit 15B is entirely positioned above a region offset toward the rear side of the inside of the container 50.

(Step S40)

Next, the control unit 70 raises the container 50. In the timing diagram of FIG. 7, the container 50 moves upward at the same time as time t24 when it stops moving rightward. However, the control unit 70 may also start moving the container 50 upward between time t23 and time t24.

(Step S41)

Next, when t25 seconds elapse since t0, the control unit 70 switches the state of the gripping claws 30a of the first gripping unit 15A that are gripping the articles A whose weight values were the target weight value in prior step S36 from the first state (a closed state) to the second state (an open state) to cause the gripping claws 30a of the first gripping unit 15A to release the articles A and discharge the articles A to the first discharge chute 60A below.

In this way, the positional relationship between the gripping units 15 and the container 50 is switched to the second positional relationship in which the container 50 obstructs discharge of the articles gripped by the second gripping unit 15B but does not obstruct discharge of the articles gripped by the first gripping unit 15A.

(Step S42)

Next, when t26 seconds elapse since t0, the control unit 70 stops raising the container 50. At this time, the container 50 reaches a position directly below the second gripping unit 15B where the gripping claws 30a of the grippers 30 can grip the articles A in the container 50. In this position, the gripping claws 30a are in the article group A1 in the container 50, and at the same time the gripping claws 30a return to the initial state.

Here also, the control unit 70 finishes moving the container 50 leftward or rightward and moving the unit drive units 10 forward or backward before the container 50 finishes rising, so the article group A1 in the container 50 is kept from ending up being shifted in either forward and backward or leftward and rightward directions.

Furthermore, the control unit 70 switches the gripping claws 30a to the second state (an open state in which the gripping claws 30a are open) before the container 50 finishes rising, so the articles A in the container 50 are kept from ending up being shifted to the outer sides of the gripping claws 30a.

(Step S43)

Next, when t27 seconds elapse since t0, the control unit 70 switches the gripping claws 30a of the second gripping unit 15B from the initial state to the first state (a closed state) to cause the gripping claws 30a to grip the articles A.

In this way, in the article gripping system 110, the gripping claws 30a are switched to the first state (a closed state in which the gripping claws 30a are closed) in a state in which they are in the middle of the article group A1 in the container 50, so the articles A can be reliably held.

(Step S44)

Next, when t28 seconds elapse since t0, the control unit 70 lowers the container 50 while maintaining the state in which the plural grippers 30 are gripping the articles A.

(Step S45)

Next, when t29 seconds elapse since t0, the control unit 70 moves the second gripping unit 15B forward. The gripping claws 30a and the article group A1 in the container 50 are away from each other as a result of the container 50 moving downward a predetermined distance between time t28 and time t29, so even when the second gripping unit 15B moves forward, the articles A gripped by the gripping claws 30a and the article group A1 in the container 50 do not interfere with each other.

(Step S46)

Next, the control unit 70 measures the weights of the articles A gripped by the grippers 30 corresponding to the weighers 40 of the second gripping unit 15B. In this way, because the article gripping system 110 is a type where the container 50 moves upward, downward, leftward, and rightward and the gripping units 15 move forward and backward, the gripping units 15 can move in advance in forward and backward directions before gripping the articles A and weigh the articles A right after gripping hold of them.
(Step S47)

Next, the control unit 70 determines whether or not at least one of the weighing results of the weighers 40 meets a predetermined condition for returning the articles A gripped by the grippers 30 to the container 50 without discharging them to the discharge chute 60.

The predetermined condition specifically is a condition where the weight values of the articles A weighed by the weighers 40 are not a preset target weight value.

The control unit 70 proceeds to step S3 when it determines that none of the weighing results of the weighers 40 meet the predetermined condition.
(Step S48)

Next, the control unit 70 controls the gripping member drive mechanisms 30b of the grippers 30 meeting the predetermined condition to cause those grippers 30 to release the articles A.

In other words, if there are grippers 30 gripping articles A whose weight values are not the target weight value, the control unit 70 causes those grippers 30 to release the articles A and drop the articles A into the container 50. The articles A that have dropped into the container 50 are reutilized as the articles A in the article group A1.

Meanwhile, the control unit 70 causes the grippers 30 gripping the articles A whose weight values are the target weight value to maintain their grip.
(Step S49)

Next, when t30 seconds elapse since t0, the control unit 70 stops lowering the container 50 and thereafter repeats the operations from step S3 on.

The operations from step S1 to step S49 are an example, and the order of the operations of the steps may also be interchanged.

(4) Characteristics (4-1)

The article gripping system 110 switches between the first positional relationship in which the container 50 obstructs discharge of the articles gripped by the first gripping unit 15A but does not obstruct discharge of the articles gripped by the second gripping unit 15B and the second positional relationship in which the container 50 obstructs discharge of the articles gripped by the second gripping unit 15B but does not obstruct discharge of the articles by the first gripping unit 15A, so the gripping units do not move while they are holding the articles A, and the articles can be prevented from falling out of the gripping units 15.

(4-2)

In the article gripping system 110, the first gripping unit 15A and the second gripping unit 15B are disposed in the horizontal direction, the container 50 can be horizontally moved in leftward and rightward directions by the leftward and rightward moving mechanisms, and the position of the article group A1 in the container 50 and the article gripping positions set for each of the gripping units 15 can be aligned.

(4-3)

In the article gripping system 110, the first gripping unit 15A and the second gripping unit 15B are disposed in the horizontal direction, the first gripping unit 15A can be horizontally moved in forward and backward directions by the first unit drive unit 10A, the second gripping unit 15B can be horizontally moved in forward and backward directions by the second unit drive unit 10B, and the position of the article group in the container 50 and the article gripping positions set for each of the gripping units 15 can be aligned.

(4-4)

In the article gripping system 110, the container 50 can be moved in upward and downward directions by the vertical moving mechanisms, so that even in a case where the container 50 is disposed away from the gripping units 15 in the vertical direction, the position of the article group A1 in the container 50 and the article gripping positions set for each of the gripping units 15 can be aligned.

(4-5)

In the article gripping system 110, when raising the container 50, the control unit 70 finishes moving the container 50 leftward or rightward and moving the unit drive units 10 forward or backward before the container 50 finishes rising, so the article group A1 in the container 50 is kept from ending up being shifted in either forward and backward or leftward and rightward directions.

(4-6)

The plural gripping claws 30a of the gripping units 15 are switched to at least either of the first state and the second state. The first state is a state in which the relative distance between the gripping claws 30a is decreased to the first distance so that the gripping claws 30a grip the articles. The second state is a state in which the relative distance between the gripping claws 30a is increased to the second distance greater than the first distance so that the gripping claws 30a release the articles.

(4-7)

In the article gripping system 110, when raising the container 50, the control unit 70 switches the gripping claws 30a to the second state (an open state in which the gripping claws 30a are open) before the container 50 finishes rising, so the articles A in the container 50 are kept from ending up being shifted to the outer sides of the gripping claws 30a.

(4-8)

In the article gripping system 110, the gripping claws 30a are switched to the first state (a closed state in which the gripping claws 30a are closed) in a state in which they are in the middle of the article group A1 in the container 50, so the articles A can be reliably held.

(4-9)

The article gripping system 110 is a type where the container 50 moves upward, downward, leftward, and rightward and the gripping units 15 move forward and backward, so the gripping units 15 can move in advance in forward and backward directions before gripping the articles and weigh the articles right after gripping hold of them.

(4-10)

In the article gripping system 110, the vertical moving mechanisms 57 do not need to raise and lower the leftward and rightward moving mechanisms 56 and need only raise and lower just the container 50, so the load when raising and lowering the container 50 is mitigated.

(4-11)

In the article gripping system 110, by avoiding disposing the leftward and rightward moving mechanisms 56 in the space above the inlets of the discharge chutes 60, contamination of the discharge chutes 60 is prevented.

(4-12)

In the article gripping system 110, by avoiding disposing the vertical moving mechanisms 57 in the space above the inlets of the discharge chutes 60, contamination of the discharge chutes 60 is prevented.

(4-13)

In the article gripping system 110, the control unit 70 moves the article group A1 in the container 50 to a first gripping position where the first gripping unit 15A grips the articles A. Moreover, the control unit 70 causes the first gripping unit 15A to grip the articles A and thereafter moves the article group A1 in the container 50 to a second gripping position where the second gripping unit 15B grips the articles.

(4-14)

In the article gripping system 110, the control unit 70 moves the article group A1 in the container 50 to the second gripping position and thereafter causes the first gripping unit 15A to release the articles A and causes the second gripping unit 15B to grip the articles A from the article group A1 in the container 50.

(4-15)

The article gripping system 110 interlinks the operation where the control unit 70 causes the first gripping unit 15A to release the articles A and the operation where the control unit 70 causes the second gripping unit 15B to grip the articles A.

(5) Other

Here, exemplary description will be given in regard to the configurations of the forward and backward moving mechanisms 11 of the unit drive units 10 and the leftward and rightward moving mechanisms 56 and the vertical moving mechanisms 57 of the container drive unit 54.

(5-1) Forward and Backward Moving Mechanism 11

FIG. 9 is a plan view showing an example of the forward and backward moving mechanism 11. In FIG. 9, the forward and backward moving mechanism 11 includes a block 111, a ball screw 112, a servo motor 113, two linear guides 114, and two guide blocks 115.

The coupling member 16 of the gripping unit 15 is secured to the block 111. The guide blocks 115 are secured to the left and right end portions of the block 111. One guide block 115 is slidably fitted together with one linear guide 114. The linear guides 114 are supported by the frames 12 of the unit drive unit 10. When the block 111 moves, the guide blocks 115 move along the linear guides 114.

A screw hole into which the ball screw 112 screws is formed through the center of the block 111. The ball screw 112 is rotated by the servo motor 113.

When the servo motor 113 rotates the ball screw 112 in one direction, the block 111 moves forward, and when the servo motor 113 rotates the ball screw 112 in the other direction, the block 111 moves backward.

As a result, the gripping unit 15 coupled via the coupling member 16 to the block 111 can horizontally move forward and backward.

(5-2) Leftward and Rightward Moving Mechanism 56

Figure 10A:
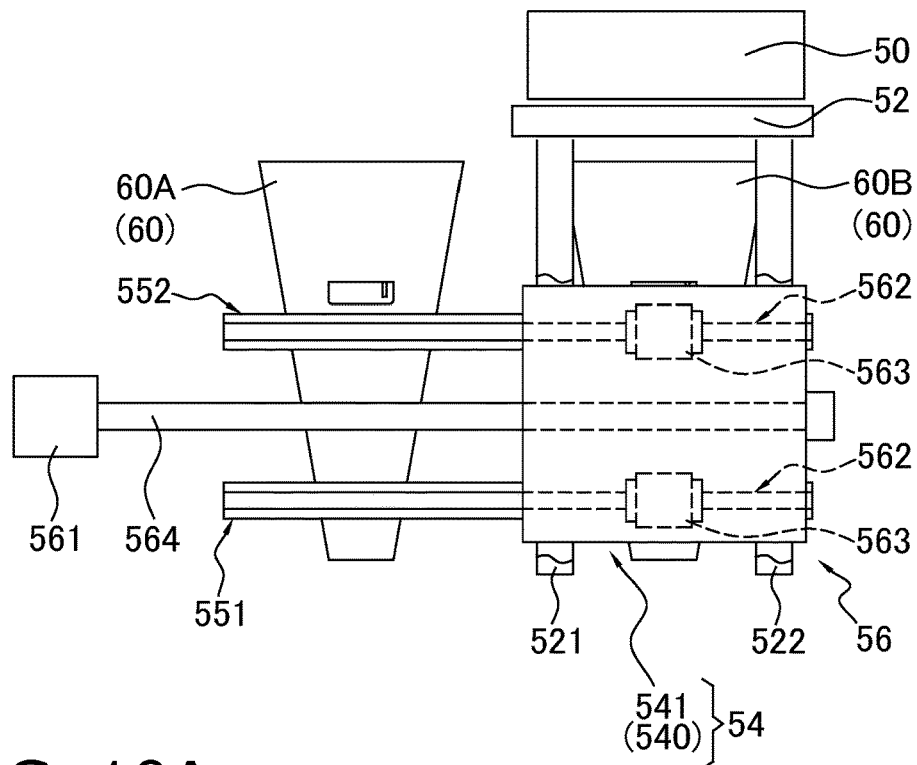
FIG. 10A is a front view showing an example of a container drive unit that houses a leftward and rightward moving mechanism.

FIG. 10A is a front view showing an example of the container drive unit 54 that houses the leftward and rightward moving mechanism 56. In FIG. 10A, the leftward and rightward moving mechanism 56 is provided in each of the first driver 541 and the second driver 542. Below, the first driver 541 will be taken as an example and described.

The leftward and rightward moving mechanism 56 includes a servo motor 561, two linear guides 562, two guide blocks 563, and a ball screw 564. The guide blocks 563 are secured to the upper and lower end portions of the first driver 541. One guide block 563 is slidably fitted together with one linear guide 562.

In the case of the first driver 541, the linear guides 562 are supported by the first horizontal support 551 and the second horizontal support 552. In the case of the second driver 542, the linear guides 562 are supported by the third horizontal support 553 and the fourth horizontal support 554.

When the first driver 541 moves, the guide blocks 563 move along the linear guides 562. A screw hole into which the ball screw 564 screws is formed horizontally through the center of the first driver 541. The ball screw 564 is rotated by the servo motor 561.

When the servo motor 561 rotates the ball screw 564 in one direction, the first driver 541 moves leftward, and when the servo motor 561 rotates the ball screw 564 in the other direction, the first driver 541 moves rightward.

(5-3) Vertical Moving Mechanism 57

Figure 10B:
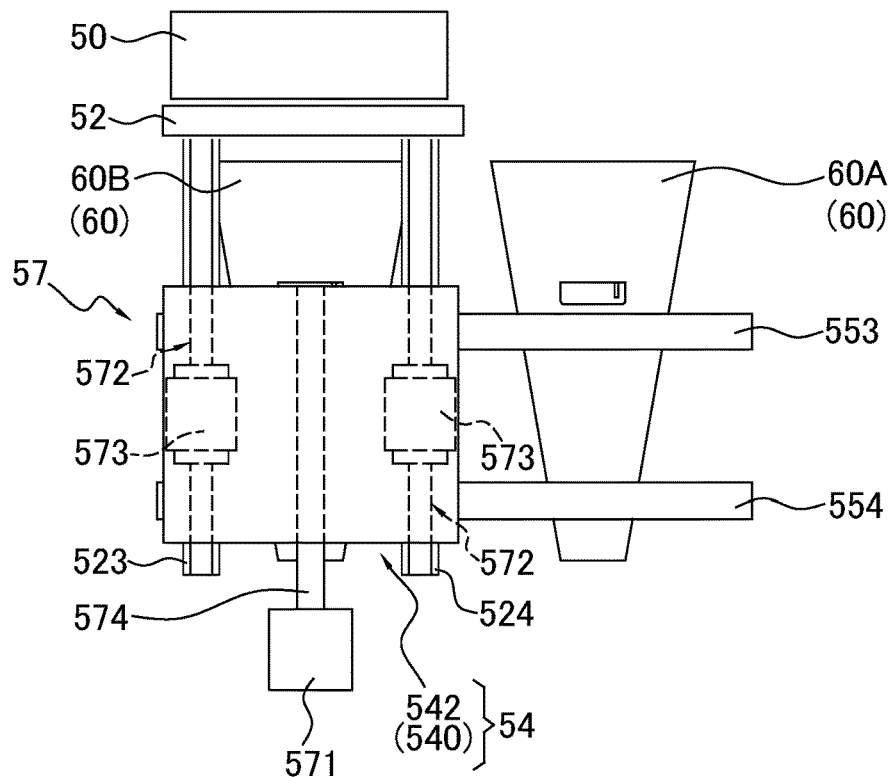
FIG. 10B is a front view showing an example of the container drive unit that houses a vertical moving mechanism.

FIG. 10B is a front view showing an example of the container drive unit 54 that houses the vertical moving mechanism 57. In FIG. 10B, the vertical moving mechanism 57 is provided in each of the first driver 541 and the second driver 542. Below, the second driver 542 will be taken as an example and described.

The vertical moving mechanism 57 includes a servo motor 571, two linear guides 572, two guide blocks 573, and a ball screw 574. The guide blocks 573 are secured to the left and right end portions of the second driver 542. One guide block 573 is slidably fitted together with one linear guide 572.

In the case of the second driver 542, the linear guides 572 are supported by the third vertical support 523 and the fourth vertical support 524. In the case of the first driver 541, the linear guides 572 are supported by the first vertical support 521 and the second vertical support 522.

When the second driver 542 moves, the guide blocks 573 move along the linear guides 572. A screw hole into which the ball screw 574 screws is formed vertically through the second driver 542. The ball screw 574 is rotated by the servo motor 571.

When the servo motor 571 rotates the ball screw 574 in one direction, the second driver 542 moves upward, and when the servo motor 571 rotates the ball screw 574 in the other direction, the second driver 542 moves downward.

REFERENCE SIGNS LIST

10 Unit Drive Units (Drive Unit)
10A First Unit Drive Unit (Drive Unit)
10B Second Unit Drive Unit (Drive Unit)
11 Forward and Backward Moving Mechanisms (Second Horizontal Moving Mechanism)
15 Gripping Units
15A First Gripping Unit (Gripping Unit)
15B Second Gripping Unit (Gripping Unit)
56 Leftward and Rightward Moving Mechanisms (First Horizontal Moving Mechanism)
57 Vertical Moving Mechanisms
30a Gripping Claws (Claws)
60 Discharge Chutes
60A First Discharge Chute
60B Second Discharge Chute
70 Control Unit
110 Article Gripping System

CITATION LIST

Patent Literature

Patent Document 1: JP-A No. H6-3182

The invention claimed is:

1. An article gripping system that grips and discharges articles from an article group stored in a container, the article gripping system comprising:
a plurality of gripping units that grip the articles;
a weigher that measures a weight value of the articles;
a drive unit that moves at least one of the container and the gripping units relative to the other; and
a control unit that controls the drive unit to move at least one of the container and the gripping units to thereby switch a positional relationship between the container and one of the gripping units between a first positional relationship in which the container obstructs discharge of the articles gripped by the one of the gripping units and a second positional relationship in which the container does not obstruct discharge of the articles gripped by the one of the gripping units, wherein
when the one of the gripping units grips the articles in the state of the first positional relationship, in a case the controller decides to return the articles gripped by the gripping unit to the container without discharging the articles based on the weight value, the controller causes the gripping unit to return the articles gripped by the gripping unit to the container without changing the first positional relationship, and further in a case the controller decides to discharge the articles gripped by the gripping unit to downstream based on the weight value, the controller changes the positional relationship to the second position relationship from the first positional relationship.

2. The article gripping system of claim 1, wherein the drive unit includes a first horizontal moving mechanism that moves at least one of the container and the gripping units relative to the other in a first horizontal direction.

3. The article gripping system of claim 2, wherein the drive unit further includes a second horizontal moving mechanism that moves at least one of the container and the gripping units relative to the other in a second horizontal direction different from the first horizontal direction.

4. The article gripping system of claim 3, wherein the second horizontal moving mechanism moves the gripping units in the second horizontal direction different from the first horizontal direction.

5. The article gripping system of claim 2, wherein the first horizontal moving mechanism moves the container and a vertical moving mechanism that moves at least one of the container and the gripping units relative to the other in a vertical direction in the first horizontal direction.

6. The article gripping system of claim 5, further comprising a discharge chute that has an inlet positioned lower than the container, receives, in the inlet, the articles released and dropped by the gripping units, and discharges them to a predetermined place, wherein the first horizontal moving mechanism operates below the inlet of the discharge chute.

7. The article gripping system of claim 6, wherein the vertical moving mechanism completely finishes moving the container in the vertical direction below the inlet of the discharge chute.

8. The article gripping system of claim 1, wherein the drive unit further includes a vertical moving mechanism that moves at least one of the container and the gripping units relative to the other in a vertical direction.

9. The article gripping system of claim 8, wherein
the control unit raises or lowers the container via the vertical moving mechanism, and
when raising the container, the control unit finishes operating a first horizontal moving mechanism that moves at least one of the container and the gripping units relative to the other in a first horizontal direction and a second horizontal moving mechanism that moves at least one of the container and the gripping units relative to the other in a second horizontal direction different from the first horizontal direction before the container finishes rising.

10. The article gripping system of claim 1, wherein
the gripping units include a plurality of claws, and
the plurality of claws are switched to at least either of
a first state in which a relative distance between the claws is decreased to a first distance so that the claws grip the articles and
a second state in which the relative distance between the claws is increased to a second distance greater than the first distance so that the claws release the articles.

11. The article gripping system of claim 10, wherein
the control unit raises or lowers the container via a vertical moving mechanism that moves at least one of the container and the gripping units relative to the other in a vertical direction, and
when raising the container, the control unit switches the plurality of claws to the second state before the container finishes rising.

12. The article gripping system of claim 11, wherein the control unit switches the plurality of claws to the first state after it has raised the container.

13. The article gripping system of claim 1, wherein
the plurality of gripping units include at least a first gripping unit and a second gripping unit,
the control unit moves the article group in the container to a first gripping position where the first gripping unit grips the articles, and
the control unit causes the first gripping unit to grip the articles and thereafter moves the article group in the container to a second gripping position where the second gripping unit grips the articles.

14. The article gripping system of claim 13, wherein the control unit moves the article group in the container to the second gripping position and thereafter causes the first gripping unit to release the articles and causes the second gripping unit to grip the articles from the article group in the container.

15. The article gripping system of claim 14, wherein the control unit interlinks operation of causing the first gripping unit to release the articles and operation of causing the second gripping unit to grip the articles.

* * * * *